US007874902B2

(12) United States Patent
Pullman

(10) Patent No.: US 7,874,902 B2
(45) **Date of Patent: *Jan. 25, 2011**

(54) COMPUTER-IMPLEMENTED SIMULATED CARD GAME

(75) Inventor: Eric Pullman, Newburgh, NY (US)

(73) Assignee: Scientific Games International. Inc., Newark, DE (US)

( * ) Notice: Subject to any disclaimer, the term of this patent is extended or adjusted under 35 U.S.C. 154(b) by 280 days.

This patent is subject to a terminal disclaimer.

(21) Appl. No.: 11/377,481

(22) Filed: Mar. 16, 2006

(65) Prior Publication Data

US 2006/0223605 A1 Oct. 5, 2006

(51) Int. Cl.
*A63F 13/00* (2006.01)
*A63F 1/00* (2006.01)

(52) U.S. Cl. ............................ 463/13; 463/11; 463/12; 463/16; 463/42; 273/138.1; 273/138.2

(58) Field of Classification Search ............ 463/11-13, 463/16, 42; 273/138.1, 138.2
See application file for complete search history.

(56) References Cited

U.S. PATENT DOCUMENTS

| | | | |
|---|---|---|---|
| 1,527,929 | A | 2/1925 | Simons |
| 3,089,123 | A | 5/1963 | Hennis et al. |
| 3,245,697 | A | 4/1966 | BNugent |
| 3,505,646 | A | 4/1970 | Affel, Jr. et al. |
| 3,699,311 | A | 10/1972 | Dunbar |
| 3,736,368 | A | 5/1973 | Vogelman et al. |
| 3,826,499 | A | 7/1974 | Lenkoff |
| 3,868,057 | A | 2/1975 | Chavez |
| 3,876,865 | A | 4/1975 | Bliss |
| 3,902,253 | A | 9/1975 | Sabuzawa et al. |
| 3,918,174 | A | 11/1975 | Miller et al. |
| 3,922,529 | A | 11/1975 | Orloff |
| 3,934,120 | A | 1/1976 | Maymarev |

(Continued)

FOREIGN PATENT DOCUMENTS

| | | |
|---|---|---|
| AU | B-18428/92 | 12/1992 |

(Continued)

OTHER PUBLICATIONS

'Are You In'?, (Article), Feb. 20, 1998 Print Date.

(Continued)

*Primary Examiner*—Peter DungBa Vo
*Assistant Examiner*—William H McCulloch
(74) *Attorney, Agent, or Firm*—Dority & Manning, P.A.

(57) ABSTRACT

Various embodiments of methods and apparatus and systems for playing a simulated card game, such as Texas Hold'em Poker, are provided. One embodiment comprises a method for playing a simulated card game. One such method comprises the steps of: displaying a plurality of entries and at least one of a set of community game elements to a virtual game to a player, each entry including at least two game elements, each game element associated with a game value according to a game rule for the virtual game; receiving a wager from the player, the wager associated with at least one bet type; displaying the remaining of the set of community game elements to the player; and determining whether the wager wins based on the plurality of entries, the at least one bet type, and according to the game rule for the virtual game.

15 Claims, 18 Drawing Sheets

U.S. PATENT DOCUMENTS 3,982,102 A 9/1976 Cidade
4,001,551 A * 1/1977 Hirsimaki ................. 235/70 A
4,017,834 A 4/1977 Cuttill et al.
4,095,824 A 6/1978 Bachman
4,105,156 A 8/1978 Dethloff
4,176,406 A 11/1979 Matkan
4,191,376 A 3/1980 Goldman et al.
4,194,296 A 3/1980 Pagnozzi et al.
4,195,772 A 4/1980 Nishimura
4,206,920 A 6/1980 Weatherford et al.
4,241,942 A 12/1980 Bachman
4,243,216 A 1/1981 Mazumber
4,273,362 A 6/1981 Carrier et al.
4,309,452 A 1/1982 Sachs
4,313,087 A 1/1982 Weitzen et al.
4,355,300 A 10/1982 Weber
4,375,666 A 3/1983 Buck et al.
4,398,708 A 8/1983 Goldman et al.
4,407,443 A 10/1983 McCorkle
4,451,759 A 5/1984 Heynisch
4,455,039 A 6/1984 Weitzen et al.
4,457,430 A 7/1984 Darling et al.
4,464,423 A 8/1984 LaBianca et al.
4,466,614 A 8/1984 Bachman et al.
4,488,646 A 12/1984 McCorkle
4,491,319 A 1/1985 Nelson
4,494,197 A 1/1985 Troy et al.
4,536,218 A 8/1985 Ganho
4,544,184 A 10/1985 Freund et al.
4,579,371 A 4/1986 Long et al.
4,591,189 A 5/1986 Holmen et al.
4,634,149 A 1/1987 Donovan
4,665,502 A 5/1987 Kreisner
4,669,729 A 6/1987 Solitt et al.
4,689,742 A 8/1987 Troy et al.
4,726,608 A 2/1988 Walton
4,736,109 A 4/1988 Dvorzsak
4,740,016 A 4/1988 Konecny et al.
4,760,247 A 7/1988 Keane et al.
4,763,927 A 8/1988 Schneider
4,764,666 A 8/1988 Bergeron
4,775,155 A 10/1988 Lees
4,792,667 A 12/1988 Chen
4,805,907 A 2/1989 Hagiwara
4,817,951 A 4/1989 Crouch et al.
4,835,624 A 5/1989 Black et al.
4,836,546 A 6/1989 Dire et al.
4,836,553 A 6/1989 Suttle et al.
4,837,728 A 6/1989 Barrie et al.
4,856,787 A 8/1989 Itkis
4,861,041 A 8/1989 Jones et al.
4,870,260 A 9/1989 Niepolomski et al.
4,880,964 A 11/1989 Donahue
4,888,244 A 12/1989 Klinge
4,892,310 A 1/1990 Patterson
4,922,522 A 5/1990 Scanlon
4,943,090 A 7/1990 Fienberg
4,960,611 A 10/1990 Fujisawa et al.
4,961,578 A 10/1990 Chateau
4,964,642 A 10/1990 Kamille
4,996,705 A 2/1991 Entenmann et al.
4,998,010 A 3/1991 Chandler et al.
4,998,199 A 3/1991 Tashiro et al.
5,032,708 A 7/1991 Comerford et al.
5,037,099 A 8/1991 Burtch
5,046,737 A 9/1991 Fienberg
5,074,566 A 12/1991 Desbiens
5,083,815 A 1/1992 Scrymgeour et al.
5,092,598 A 3/1992 Kamille
5,094,458 A 3/1992 Kamille
5,100,139 A 3/1992 Di Bella
5,106,091 A * 4/1992 Comito ....................... 463/22
5,109,153 A 4/1992 Johnsen et al.
5,112,050 A 5/1992 Koza et al.
5,116,049 A 5/1992 Sludikoff et al.
5,118,109 A 6/1992 Gumina
5,119,295 A 6/1992 Kapur
5,158,293 A 10/1992 Mullins
5,165,967 A 11/1992 Theno et al.
5,186,463 A 2/1993 Marin et al.
5,189,292 A 2/1993 Batterman et al.
5,193,815 A 3/1993 Pollard
5,193,854 A 3/1993 Borowski, Jr. et al.
5,228,692 A 7/1993 Carrick et al.
5,232,221 A 8/1993 Sludikoff et al.
5,234,798 A 8/1993 Heninger et al.
5,249,801 A 10/1993 Jarvis
5,259,616 A 11/1993 Bergmann
5,273,281 A 12/1993 Lovell
5,276,980 A 1/1994 Carter et al.
5,282,620 A 2/1994 Keesee
5,308,992 A 5/1994 Crane et al.
5,317,135 A 5/1994 Finocchio
5,326,104 A 7/1994 Pease et al.
5,332,219 A 7/1994 Marnell, II et al.
5,342,047 A 8/1994 Hiedel et al.
5,342,049 A 8/1994 Wichinsky et al.
5,344,144 A 9/1994 Canon
5,346,258 A 9/1994 Behn et al.
5,380,007 A 1/1995 Travis et al.
5,382,025 A 1/1995 Sklansky et al.
5,390,934 A 2/1995 Grassa
5,393,057 A 2/1995 Marnell, II et al.
5,401,024 A 3/1995 Simunek
5,401,541 A 3/1995 Simunek
5,403,039 A 4/1995 Borowski, Jr. et al.
5,407,199 A 4/1995 Gumina
5,420,406 A 5/1995 Izawa et al.
5,432,005 A 7/1995 Tanigami et al.
5,451,052 A 9/1995 Behm et al.
5,453,602 A 10/1995 Hanada
5,456,465 A 10/1995 Durham
5,471,039 A 11/1995 May
5,471,040 A 11/1995 May
5,475,205 A 12/1995 Behm et al.
5,476,259 A * 12/1995 Weingardt .................. 463/28
5,486,005 A 1/1996 Neal
5,499,816 A 3/1996 Levy
5,513,846 A 5/1996 Niederlien et al.
5,528,154 A 6/1996 Leichner et al.
5,536,016 A 7/1996 Thompson
5,540,442 A 7/1996 Orselli et al.
5,548,110 A 8/1996 Storch et al.
5,550,746 A 8/1996 Jacobs
5,560,610 A 10/1996 Behm et al.
5,564,700 A 10/1996 Celona
5,564,977 A 10/1996 Algie
5,591,956 A 1/1997 Longacre, Jr. et al.
5,599,046 A 2/1997 Behm et al.
5,602,381 A 2/1997 Hoshino et al.
5,621,200 A 4/1997 Irwin et al.
5,628,684 A 5/1997 Bouedec
5,630,753 A 5/1997 Fuchs
5,651,735 A 7/1997 Baba
5,655,961 A 8/1997 Acres et al.
5,664,781 A 9/1997 Feola
5,667,250 A 9/1997 Behm et al.
5,682,819 A 11/1997 Beatty
5,690,366 A 11/1997 Luciano
5,704,647 A 1/1998 Desbiens
5,722,891 A 3/1998 Inoue
5,726,898 A 3/1998 Jacobs
5,732,948 A 3/1998 Yoseloff
5,741,183 A 4/1998 Acres et al.

5,743,800 A 4/1998 Huard et al.
5,752,882 A 5/1998 Acres et al.
5,756,220 A 5/1998 Hoshino et al.
5,768,142 A 6/1998 Jacobs
5,769,458 A 6/1998 Carides et al.
5,770,533 A 6/1998 Franchi
5,772,509 A 6/1998 Weiss
5,772,510 A 6/1998 Roberts
5,772,511 A 6/1998 Smeltzer
RE35,864 E 7/1998 Weingardt
5,779,840 A 7/1998 Boris
5,789,459 A 8/1998 Inagaki et al.
5,791,990 A 8/1998 Schroeder et al.
5,797,794 A 8/1998 Angell
5,803,504 A 9/1998 Deshiens et al.
5,816,920 A 10/1998 Hanai
5,818,019 A 10/1998 Irwin, Jr. et al.
5,820,459 A 10/1998 Acres et al.
5,823,872 A * 10/1998 Prather et al. .................. 463/6
5,823,874 A 10/1998 Adams
5,830,063 A 11/1998 Byrne
5,830,066 A 11/1998 Goden et al.
5,830,067 A 11/1998 Graves et al.
5,833,537 A 11/1998 Barrie
5,835,576 A 11/1998 Katz et al.
5,836,086 A 11/1998 Elder
5,836,817 A 11/1998 Acres et al.
5,839,731 A 11/1998 Feola
5,848,932 A 12/1998 Adams
5,863,075 A 1/1999 Rich et al.
5,868,392 A 2/1999 Kraft
5,871,398 A 2/1999 Schneier et al.
5,876,284 A 3/1999 Acres et al.
5,882,261 A 3/1999 Adams
5,883,537 A 3/1999 Luoni et al.
5,885,158 A 3/1999 Torango et al.
5,887,906 A 3/1999 Sultan
5,888,136 A * 3/1999 Herbert ....................... 463/22
5,903,340 A 5/1999 Lawandy et al.
5,911,418 A 6/1999 Adams
5,915,588 A 6/1999 Stoken et al.
5,934,671 A 8/1999 Harrison
5,970,143 A 10/1999 Shneier et al.
5,979,894 A 11/1999 Alexoff
5,984,779 A * 11/1999 Bridgeman et al. ........... 463/16
5,996,997 A 12/1999 Kamille
5,997,044 A 12/1999 Behm et al.
6,004,207 A 12/1999 Wilson, Jr. et al.
6,004,208 A 12/1999 Wilson, Jr. et al.
6,007,162 A 12/1999 Hinz et al.
6,012,982 A 1/2000 Piechowiak et al.
6,014,819 A 1/2000 Maddix et al.
6,017,032 A 1/2000 Grippo et al.
6,024,641 A 2/2000 Sarno
6,033,307 A 3/2000 Vancura
6,050,895 A * 4/2000 Luciano et al. ................ 463/7
6,053,405 A 4/2000 Irwin, Jr. et al.
6,077,162 A 6/2000 Weiss
6,080,062 A 6/2000 Olson
6,086,477 A 7/2000 Walker et al.
6,089,978 A 7/2000 Adams
6,099,407 A 8/2000 Parker, Jr. et al.
6,102,400 A 8/2000 Scott et al.
6,107,913 A 8/2000 Gatto et al.
6,119,364 A 9/2000 Elder
6,125,368 A 9/2000 Bridge et al.
6,142,872 A 11/2000 Walker et al.
6,146,272 A 11/2000 Walker et al.
6,149,521 A 11/2000 Sanduski
6,152,822 A * 11/2000 Herbert ....................... 463/22
6,155,491 A 12/2000 Dueker et al.
6,168,521 B1 1/2001 Luciano et al.
6,168,522 B1 1/2001 Walker et al.
6,179,710 B1 1/2001 Sawyer et al.
6,203,430 B1 3/2001 Walker et al.
6,206,373 B1 3/2001 Garrod
6,210,275 B1 4/2001 Olsen
6,217,448 B1 4/2001 Olsen
6,220,596 B1 4/2001 Horan
6,220,961 B1 4/2001 Keane et al.
6,224,055 B1 5/2001 Walker et al.
6,227,969 B1 5/2001 Yoseloff
6,238,288 B1 5/2001 Walker et al.
6,309,300 B1 10/2001 Glavich
6,312,334 B1 11/2001 Yoseloff
6,315,291 B1 11/2001 Moody
6,330,976 B1 12/2001 Dymetman et al.
6,331,143 B1 12/2001 Yoseloff
6,334,814 B1 1/2002 Adams
6,340,158 B2 1/2002 Pierce et al.
6,368,213 B1 4/2002 McNabola
6,375,568 B1 4/2002 Roffman et al.
6,379,742 B1 4/2002 Behm et al.
6,394,899 B1 5/2002 Walker et al.
6,398,214 B1 6/2002 Moteki et al.
6,398,643 B1 6/2002 Knowles et al.
6,398,644 B1 6/2002 Perrie et al.
6,398,645 B1 6/2002 Yoseloff
6,416,408 B2 7/2002 Tracy et al.
6,419,579 B1 7/2002 Bennett
6,435,408 B1 8/2002 Irwin, Jr. et al.
6,435,500 B2 8/2002 Gumina
6,478,677 B1 11/2002 Moody
6,491,215 B1 12/2002 Irwin, Jr. et al.
6,497,408 B1 12/2002 Walker et al.
6,511,068 B1 * 1/2003 Sklansky et al. ............ 273/237
6,511,071 B1 * 1/2003 Artle et al. .................. 273/292
6,552,290 B1 4/2003 Lawandy
6,588,747 B1 7/2003 Seelig
6,599,186 B1 7/2003 Walker et al.
6,601,772 B1 8/2003 Rubin et al.
6,637,747 B1 10/2003 Garrod
6,648,735 B2 11/2003 Miyashita et al.
6,648,753 B1 11/2003 Tracy et al.
6,648,755 B1 11/2003 Luciano et al.
6,676,126 B1 1/2004 Walker et al.
6,692,354 B2 2/2004 Tracy et al.
6,702,047 B2 3/2004 Huber
6,773,345 B2 8/2004 Walker et al.
6,776,337 B2 8/2004 Irwin, Jr. et al.
6,786,824 B2 9/2004 Cannon
6,823,874 B2 11/2004 Lexcen
6,875,105 B1 4/2005 Behm et al.
6,929,186 B2 8/2005 Lapstun
7,396,015 B2 * 7/2008 Feola ......................... 273/292
7,410,417 B2 * 8/2008 Feola .......................... 463/13
7,427,067 B2 * 9/2008 Feola ......................... 273/292
7,464,936 B2 * 12/2008 Feola ......................... 273/292
7,481,432 B2 * 1/2009 Feola ......................... 273/139
7,510,116 B2 * 3/2009 Robb et al. ................. 235/381
7,631,871 B2 * 12/2009 Bozeman .................... 273/269
7,662,038 B2 * 2/2010 Bozeman ..................... 463/17
2001/0027130 A1 10/2001 Namba et al.
2001/0030978 A1 10/2001 Holloway et al.
2001/0034262 A1 10/2001 Banyai
2001/0040345 A1 11/2001 Au-Yeung
2002/0022511 A1 2/2002 Eklund et al.
2002/0084327 A1 7/2002 Ehrhart et al.
2002/0084335 A1 7/2002 Ericson
2002/0151348 A1 10/2002 Burns et al.
2002/0171201 A1 11/2002 Au-Yeung
2002/0187825 A1 12/2002 Tracy et al.
2003/0050109 A1 3/2003 Caro et al.
2003/0114210 A1 6/2003 Meyer et al.
2004/0076310 A1 4/2004 Hersch et al.
2004/0173965 A1 9/2004 Stanek

| | | | | |
|---|---|---|---|---|
| 2004/0178582 | A1 | 9/2004 | Garrod | |
| 2004/0185931 | A1 | 9/2004 | Hartman et al. | |
| 2004/0204222 | A1 | 10/2004 | Roberts | |
| 2004/0259631 | A1 | 12/2004 | Katz et al. | |
| 2004/0266514 | A1 | 12/2004 | Penrice | |
| 2006/0154715 | A1* | 7/2006 | Black et al. | 463/13 |
| 2006/0217167 | A1* | 9/2006 | Jubinville et al. | 463/13 |
| 2006/0246983 | A1* | 11/2006 | Huard et al. | 463/16 |
| 2006/0273156 | A1 | 12/2006 | Berm et al. | |
| 2007/0018399 | A1* | 1/2007 | Feola | 273/292 |
| 2007/0018400 | A1* | 1/2007 | Feola | 273/292 |
| 2007/0018401 | A1* | 1/2007 | Feola | 273/292 |
| 2007/0077989 | A1* | 4/2007 | Bozeman | 463/25 |

FOREIGN PATENT DOCUMENTS

| | | | |
|---|---|---|---|
| AU | B-21070/92 | | 7/1993 |
| AU | A-50327/96 | | 2/1997 |
| AU | B-52499/96 | | 2/1997 |
| AU | 199716432 | B2 | 9/1997 |
| AU | A-45403/97 | | 4/1998 |
| AU | A-63553/98 | | 10/1998 |
| DE | 2938307 | C3 | 6/1982 |
| DE | 29803107 | U1 | 9/1988 |
| DE | 29816453 | U1 | 4/1999 |
| EP | 0122902 | B1 | 4/1984 |
| EP | 0333934 | A1 | 9/1989 |
| EP | 0798676 | A1 | 10/1997 |
| EP | 0149712 | A2 | 7/1998 |
| EP | 0874337 | A1 | 10/1998 |
| EP | 0896304 | A2 | 2/1999 |
| EP | 0914875 | A2 | 5/1999 |
| EP | 0914875 | A3 | 5/1999 |
| EP | 0919965 | A2 | 6/1999 |
| EP | 0983801 | A2 | 3/2000 |
| EP | 0983801 | A3 | 3/2001 |
| EP | 1149712 | A1 | 10/2001 |
| ES | 529536 | | 6/1983 |
| ES | 2006400 | | 4/1989 |
| ES | 2006401 | | 4/1989 |
| GB | 642892 | A | 9/1950 |
| GB | 2 071 369 | | 9/1981 |
| GB | 2075918 | A | 11/1981 |
| GB | 2222712 | B | 3/1990 |
| GB | 2230373 | A | 10/1990 |
| GB | 2295775 | A | 12/1996 |
| GB | 23282311 | A | 2/1999 |
| JP | 02235744 | | 9/1990 |
| JP | 04132672 | | 8/2008 |
| WO | WO85/02250 | A1 | 5/1985 |
| WO | WO91/17529 | | 11/1991 |
| WO | WO 95/10098 | | 4/1995 |
| WO | WO 98/40138 | | 9/1998 |
| WO | WO 99/09364 | A1 | 2/1999 |
| WO | WO 99/26204 | | 5/1999 |
| WO | WO 99/39312 | | 8/1999 |
| WO | WO00/00256 | | 1/2000 |
| WO | WO 01/05474 | | 1/2001 |
| WO | WO 01/42968 | | 6/2001 |
| WO | WO01/74460 | A2 | 11/2001 |
| WO | WO01/93966 | A1 | 12/2001 |
| WO | WO02/056266 | A1 | 7/2002 |

OTHER PUBLICATIONS

'Beginner's Guide-How To Bet', (www.plimico.com/How+to+wager/beginnersguide/), (Internet Article), 3 Pgs., May 25, 2005 Print Date.

Chip Brown, 'Austin American-Statesman', (Article), May 28, 1998, 2 Pgs., Texas.

John C. Hallyburton, Jr., 'Frequently Asked Questions About Keno' (Internet Article), 1995, 1998, 10 Pgs., (http://conielco.com/faq/keno.html).

'Horse betting Tutorial-Types of Bets', (www.homepokergames.com/horsebettingtutorial.php), (Internet Article), 2 Pgs, May 25, 2005 Print Date.

Judith Gaines, 'Pool Party Betting Business Booming Throughout Area Workplaces', (Internet Article), Mar. 19, 1994, 2 Pgs., Issue 07431791, Boston Globe, Boston, MA.

'Maryland Launches Let It Ride', (Internet Article), Circa 2001, 1 Pg.

'Notice of Final Rulemaking', (Internet Article), Mar. 24, 2000, 10 Pgs., vol. 6, Issue #13, Arizona Administrative Register, Arizona.

'How To Play Megabucks', (Internet Article), May 8, 2001, 2 Pgs., Oregon Lottery Megabucks, (http://www.oregonlottery.org/mega/m_howto.htm).

'Oregon Lottery', (Internet Article), Apr. 30, 2004, 9 Pgs., Oregon Lottery Web Center, (http://www.oregonlottery.org/general/g_hist.shtml).

Mike Parker, 'The History of Horse Racing' (Internet Article),1996, 1997,1998, 5 Pgs., http://www.mrmike.com/explore/hrhist.htm.

PCT Search Report, Jul. 7, 2008.

EP Search Report, Apr. 15, 2010.

* cited by examiner

1700

BETS

| | A | B | C | D | E | F | G | H | I | J | K | L |
|---|---|---|---|---|---|---|---|---|---|---|---|---|
| Win | 10,703 | 1,507 | 1,314 | 5,690 | 297 | 10,050 | 18,559 | 5,653 | 4,297 | 3,645 | 3,044 | 661 |
| Place | 9,295 | 5,414 | 17,944 | 7,972 | 17,194 | 10,863 | 11,386 | 7,322 | 7,799 | 7,476 | 2,644 | 574 |
| Show | 8,172 | 4,754 | 15,786 | 7,008 | 14,736 | 9,549 | 10,009 | 6,439 | 5,495 | 5,208 | 2,324 | 505 |

BETS

1800

| | | | | | | | |
|---|---|---|---|---|---|---|---|
| AB | 346.5 | DA | 1,386.2 | GA | 1,945.9 | JA | 2,302.5 |
| AC | 549.3 | DB | 1,732.8 | GB | 2,292.4 | JB | 2,649.1 |
| AD | 693.1 | DC | 1,935.6 | GC | 2,495.2 | JC | 2,851.8 |
| AE | 804.7 | DE | 2,191.0 | GD | 2,639.0 | JD | 2,995.7 |
| AF | 895.8 | DF | 2,282.1 | GE | 2,750.6 | JE | 3,107.3 |
| AG | 972.9 | DG | 2,359.2 | GF | 2,841.7 | JF | 3,198.4 |
| AH | 1,039.7 | DH | 2,426.0 | GH | 2,985.6 | JG | 3,275.5 |
| AI | 1,098.6 | DI | 2,484.9 | GI | 3,044.5 | JH | 3,342.3 |
| AJ | 1,151.2 | DJ | 2,537.5 | GJ | 3,097.2 | JI | 3,401.1 |
| AK | 1,198.9 | DK | 2,585.2 | GK | 3,144.8 | JK | 3,501.5 |
| AL | 1,242.4 | DL | 2,628.7 | GL | 3,188.3 | JL | 3,545.0 |
| BA | 693.1 | EA | 1,609.4 | HA | 2,079.4 | KA | 2,397.8 |
| BC | 1,242.4 | EB | 1,956.0 | HB | 2,426.0 | KB | 2,744.4 |
| BD | 1,386.2 | EC | 2,158.7 | HC | 2,628.7 | KC | 2,947.2 |
| BE | 1,497.8 | ED | 2,302.5 | HD | 2,772.5 | KD | 3,091.0 |
| BF | 1,589.0 | EF | 2,505.3 | HE | 2,884.1 | KE | 3,202.6 |
| BG | 1,666.1 | EG | 2,582.3 | HF | 2,975.3 | KF | 3,293.7 |
| BH | 1,732.8 | EH | 2,649.1 | HG | 3,052.3 | KG | 3,370.8 |
| BI | 1,791.7 | EI | 2,708.0 | HI | 3,178.0 | KH | 3,437.6 |
| BJ | 1,844.4 | EJ | 2,760.7 | HJ | 3,230.7 | KI | 3,496.5 |
| BK | 1,892.0 | EK | 2,808.3 | HK | 3,278.3 | KJ | 3,549.1 |
| BL | 1,935.6 | EL | 2,851.8 | HL | 3,321.8 | KL | 3,640.3 |
| CA | 1,098.6 | FA | 1,791.7 | IA | 2,197.2 | LA | 2,484.9 |
| CB | 1,445.1 | FB | 2,138.3 | IB | 2,543.7 | LB | 2,831.4 |
| CD | 1,791.7 | FC | 2,341.0 | IC | 2,746.5 | LC | 3,034.2 |
| CE | 1,903.3 | FD | 2,484.9 | ID | 2,890.3 | LD | 3,178.0 |
| CF | 1,994.4 | FE | 2,596.4 | IE | 3,001.9 | LE | 3,289.6 |
| CG | 2,071.5 | FG | 2,764.7 | IF | 3,093.1 | LF | 3,380.7 |
| CH | 2,138.3 | FH | 2,831.4 | IG | 3,170.1 | LG | 3,457.8 |
| CI | 2,197.2 | FI | 2,890.3 | IH | 3,236.9 | LH | 3,524.6 |
| CJ | 2,249.9 | FJ | 2,943.0 | IJ | 3,348.5 | LI | 3,583.5 |
| CK | 2,297.5 | FK | 2,990.7 | IK | 3,396.1 | LJ | 3,636.1 |
| CL | 2,341.0 | FL | 3,034.2 | IL | 3,439.6 | LK | 3,683.8 |

*FIG. 18*

1900

ODDS

| | | | | | | | |
|---|---|---|---|---|---|---|---|
| AB | 950.8 : 1 | DA | 236.9 : 1 | GA | 168.5 : 1 | JA | 142.2 : 1 |
| AC | 599.4 : 1 | DB | 189.3 : 1 | GB | 142.9 : 1 | JB | 123.5 : 1 |
| AD | 474.8 : 1 | DC | 169.4 : 1 | GC | 131.2 : 1 | JC | 114.6 : 1 |
| AE | 408.8 : 1 | DE | 149.5 : 1 | GD | 124.0 : 1 | JD | 109.1 : 1 |
| AF | 367.1 : 1 | DF | 143.5 : 1 | GE | 118.9 : 1 | JE | 105.1 : 1 |
| AG | 338.0 : 1 | DG | 138.8 : 1 | GF | 115.1 : 1 | JF | 102.1 : 1 |
| AH | 316.2 : 1 | DH | 134.9 : 1 | GH | 109.5 : 1 | JG | 99.7 : 1 |
| AI | 299.2 : 1 | DI | 131.7 : 1 | GI | 107.3 : 1 | JH | 97.7 : 1 |
| AJ | 285.5 : 1 | DJ | 129.0 : 1 | GJ | 105.5 : 1 | JI | 96.0 : 1 |
| AK | 274.1 : 1 | DK | 126.6 : 1 | GK | 103.9 : 1 | JK | 93.2 : 1 |
| AL | 264.4 : 1 | DL | 124.5 : 1 | GL | 102.4 : 1 | JL | 92.0 : 1 |
| BA | 474.8 : 1 | EA | 203.9 : 1 | HA | 157.6 : 1 | KA | 136.5 : 1 |
| BC | 264.4 : 1 | EB | 167.6 : 1 | HB | 134.9 : 1 | KB | 119.2 : 1 |
| BD | 236.9 : 1 | EC | 151.8 : 1 | HC | 124.5 : 1 | KC | 110.9 : 1 |
| BE | 219.2 : 1 | ED | 142.2 : 1 | HD | 117.9 : 1 | KD | 105.7 : 1 |
| BF | 206.5 : 1 | EF | 130.6 : 1 | HE | 113.3 : 1 | KE | 102.0 : 1 |
| BG | 196.9 : 1 | EG | 126.7 : 1 | HF | 109.8 : 1 | KF | 99.1 : 1 |
| BH | 189.3 : 1 | EH | 123.5 : 1 | HG | 107.0 : 1 | KG | 96.8 : 1 |
| BI | 183.1 : 1 | EI | 120.8 : 1 | HI | 102.8 : 1 | KH | 94.9 : 1 |
| BJ | 177.8 : 1 | EJ | 118.5 : 1 | HJ | 101.1 : 1 | KI | 93.3 : 1 |
| BK | 173.3 : 1 | EK | 116.4 : 1 | HK | 99.6 : 1 | KJ | 91.9 : 1 |
| BL | 169.4 : 1 | EL | 114.6 : 1 | HL | 98.3 : 1 | KL | 89.6 : 1 |
| CA | 299.2 : 1 | FA | 183.1 : 1 | IA | 149.1 : 1 | LA | 131.7 : 1 |
| CB | 227.2 : 1 | FB | 153.2 : 1 | IB | 128.6 : 1 | LB | 115.5 : 1 |
| CD | 183.1 : 1 | FC | 139.9 : 1 | IC | 119.1 : 1 | LC | 107.7 : 1 |
| CE | 172.3 : 1 | FD | 131.7 : 1 | ID | 113.1 : 1 | LD | 102.8 : 1 |
| CF | 164.4 : 1 | FE | 126.0 : 1 | IE | 108.9 : 1 | LE | 99.3 : 1 |
| CG | 158.2 : 1 | FG | 118.3 : 1 | IF | 105.6 : 1 | LF | 96.5 : 1 |
| CH | 153.2 : 1 | FH | 115.5 : 1 | IG | 103.0 : 1 | LG | 94.4 : 1 |
| CI | 149.1 : 1 | FI | 113.1 : 1 | IH | 100.9 : 1 | LH | 92.6 : 1 |
| CJ | 145.6 : 1 | FJ | 111.1 : 1 | IJ | 97.5 : 1 | LI | 91.0 : 1 |
| CK | 142.5 : 1 | FK | 109.3 : 1 | IK | 96.1 : 1 | LJ | 89.7 : 1 |
| CL | 139.9 : 1 | FL | 107.7 : 1 | IL | 94.9 : 1 | LK | 88.5 : 1 |

FIG. 19

COMPUTER-IMPLEMENTED SIMULATED CARD GAME

BACKGROUND OF THE INVENTION

1. Field of the Invention

The present invention generally relates to computer systems implementing games of chance. More particularly, the present invention relates to a computer system that implements a game of chance that simulates a poker-style card game.

2. Description of the Related Art

Computerized gambling, lottery games and instant games, whether run by governmental or private entities, have proven to be quite popular, and go back some time in history. Participation in a game gives a person a chance to win a substantial amount of money while also allowing private parties and lottery authorities to collect monies, some of them for public or charitable purposes. When taxed, the sales from games also provide additional revenue to state and city governments.

As technology advances, many games are ported from a paper-ticket based environment to a computer-based environment. Implementing games in a computer-based environment makes administration of games easier. Casino owners and/or government authorities can obtain almost instantaneously sales information from the gaming machines. However, implementing a traditional game in the computer-based environment is typically not a straightforward process. Many difficulties have to be overcome to preserve a game's characteristics that attract players in the first instance, and yet use the computer environment to make the game more player-friendly. One of the games that pose challenges to be ported to the computer-based environment is playing card games.

Accordingly, it is desirous to have a playing card game with a different strategic element present, such as Hold'em Poker available on a computer-based environment, where players can experience the excitement of this game along with additional information available in the computer-based environment that simplifies the game.

SUMMARY OF THE INVENTION

One embodiment comprises a method for playing a simulated card game. One such method comprises the steps of: displaying a plurality of entries and at least one of a set of community game elements to a virtual game to a player, each entry including at least two game elements, each game element associated with a game value according to a game rule for the virtual game; receiving a wager from the player, the wager associated with at least one bet type; displaying the remaining of the set of community game elements to the player; and determining whether the wager wins based on the plurality of entries, the at least one bet type, and according to the game rule for the virtual game.

Another embodiment comprises an apparatus for playing a simulated card game. One such apparatus comprises: a controller; a display device in communication with the controller, the display device configured to display a plurality of entries and at least one of a set of community game elements to a player, each entry including at least two game elements, each game element associated with a game value according to a game rule for the virtual game; a player input device in communication with the controller, the player input device configured to receive a player bet of at least one bet type selected by the player and communicate the player bet to the controller; and a ticket issuing device in communication with the controller, the ticket issuing device configured to receive ticket information from the controller and issue a ticket to the player; wherein the display device is configured to receive play information from the controller and further configured to display the play information to the player and the controller is configured to determine whether the player bet wins based on the plurality of entries and according to the game rule for the virtual game.

A further embodiment comprises a system for playing a simulated card game. One such system comprises: a communication network; at least one gaming machine in communication with the communication network; and a server in communication with the at least one gaming machine through the communication network, the server configured to host a virtual game; wherein the at least one gaming machine is configured to: receive game information from the server and display a plurality of game entries and at least one of a set of community game elements to a player, each game entry including at least two game elements, each game element associated with a game value according to a game rule for the virtual game; receive a player bet from the player and communicating the player bet to the server; receive ticket information from the server and issue a ticket to the player; display the remaining of the set of community game elements to the player; and receive winning information from the server, the winning information specifying whether the player bet wins based on the plurality of entries and according to the game rule for the virtual game.

Other aspects and features will become apparent after review of the following Brief Description of the Drawings, Detailed Description, and Claims.

BRIEF DESCRIPTION OF THE DRAWINGS

FIG. 18 illustrates another "bets" display for supporting pari-mutuel betting.

FIG. 19 illustrates an "odds" display for supporting pari-mutuel betting.

DETAILED DESCRIPTION OF THE INVENTION

The rules for the playing card game of Texas Hold'em Poker game are simple. A player makes his or her best poker hand out of seven cards, with two cards in the player's hand and the other five community cards on the table. Thus, all players still in the game use three or more of the community cards to make their best hands. The player with the strongest hand wins. The game starts with the dealer dealing two cards face down to each player, and a round of betting commences. After all bets, raises, and folds are completed, the first three community cards are dealt.

The first three community cards are turned up all at once and are called "the flop". The flop is often the turning point in the game, determining who will stick it out to see the last two cards. A round of betting occurs immediately after the flop. Most players fold here if the flop does not fit with their hand. The fourth community card is called "the turn". As in previous plays, bets are placed. Finally, the fifth and final community card is turned over. This card is commonly called "the river". The last round of betting is completed and then the players turn over their cards, and the player with the highest hand wins.

Various embodiments of methods and computer-implemented apparatus and systems for playing a simulated card game, such as Texas Hold'em Poker, are described below. It should be appreciated, however, that other types of games and card games may be implemented. In one embodiment, the game generally comprises two stages. The first stage involves determining and displaying the initial sets of two-card hands. The second stage consists of determining and displaying the community cards—the 5 cards shared by all of the players. A player can choose a set of two-card hands from a plurality of sets, wherein each set's winning odds are displayed to the player. The winning odds can be updated during the course of the game. At the end of the game, if the player has the winning hand, the player wins a prize associated with the set selected.

Figure 1:
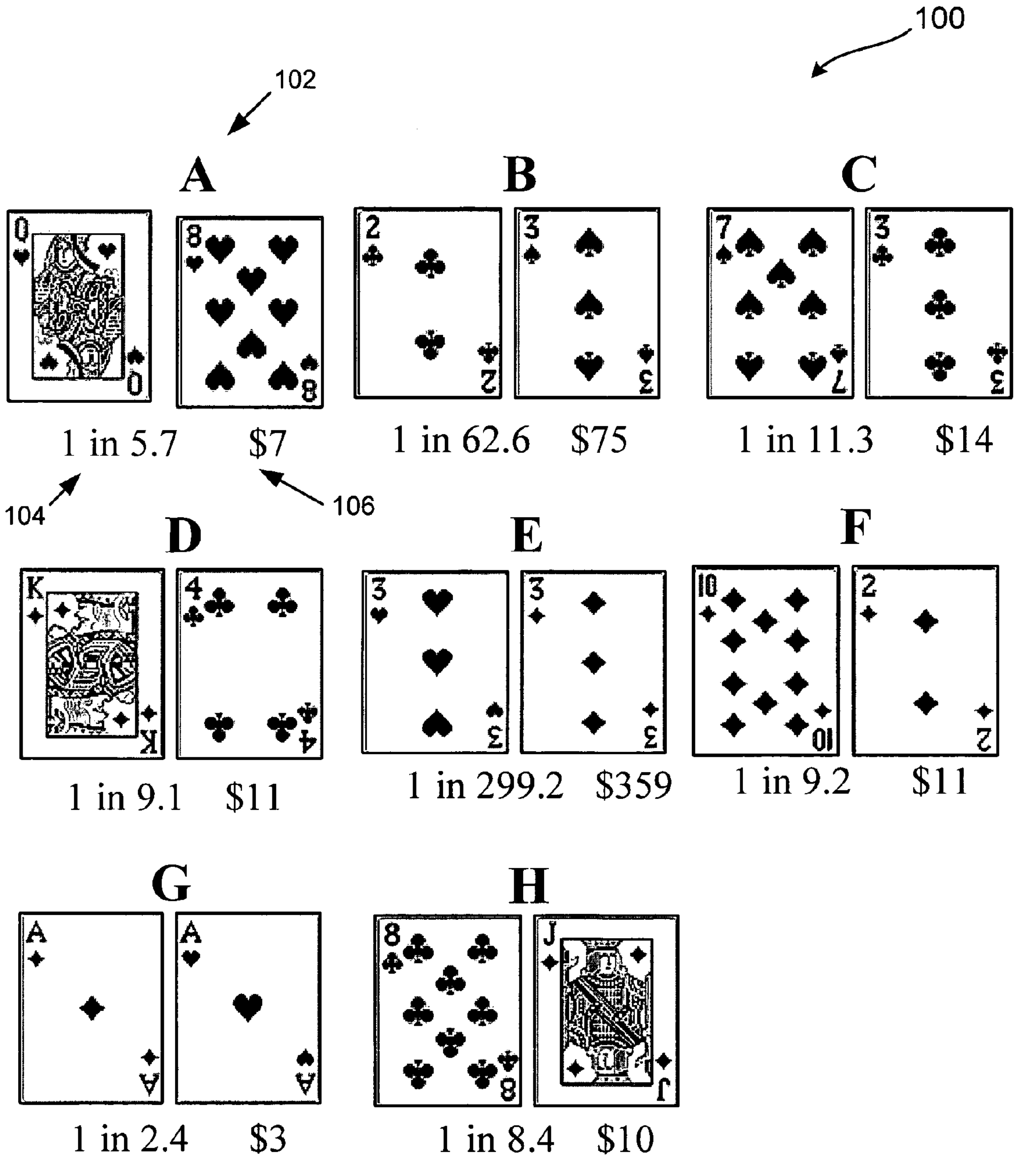
FIG. 1 depicts an initial display for a Hold'em Poker game.

FIG. 1 shows a display 100 for the initial stage of an embodiment of a Texas Hold'em Poker game. The display 100 includes a plurality of entries in a game, each entry consisting of two playing cards, or game elements, from a standard deck. Each entry is labeled with indicia 102, and the letters of the alphabet are used in this example. Various embodiments exist for determining the initial set of hands from which the player makes his selection. In one embodiment, the initial set of hands may be determined as if the set is dealt from a randomly-ordered physical deck, as in a real game. In an alternative embodiment, the initial set of hands may be selected from a pool of sets of hands. Such a pool may consist of sets of non-overlapping hands that have desirable characteristics, such as an appealing range of odds and accompanying prizes. Such a pool may be cycled through or each selection chosen at random. In yet another embodiment, the same set of initial hands may be used for all instances of the game.

When displaying these cards, in one embodiment, the cards will have first appeared on screen with the back of the card displayed, with the value of each of the three cards then being revealed one by one. In another embodiment, the value of each card is apparent when it first appears on screen. Each entry of two cards has associated with it the odds 104 that the hand will win the game and a prize amount 106. The prizes are set so that the mathematical expectations of the prize payouts 106 for the hands are as close to each other or some fixed percentage as possible given the minimum increment of the prize amounts. For example, as illustrated in the embodiment of FIG. 1, the prizes assigned to each hand are such that each prize amount 106 is an even dollar amount and the overall return for each bet is close to 60% within approximately 2%.

Figure 2:
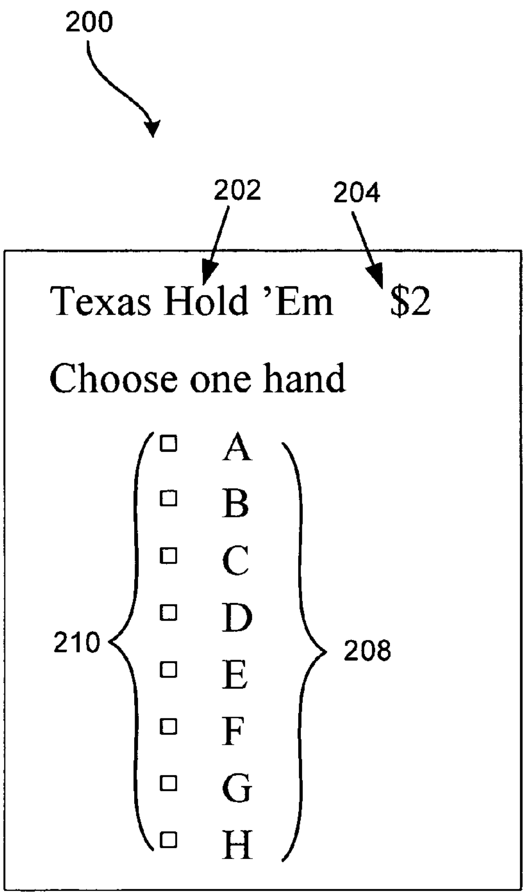
FIG. 2 illustrates a play slip used to make wagers in the Hold'em Poker game.
Figure 3:
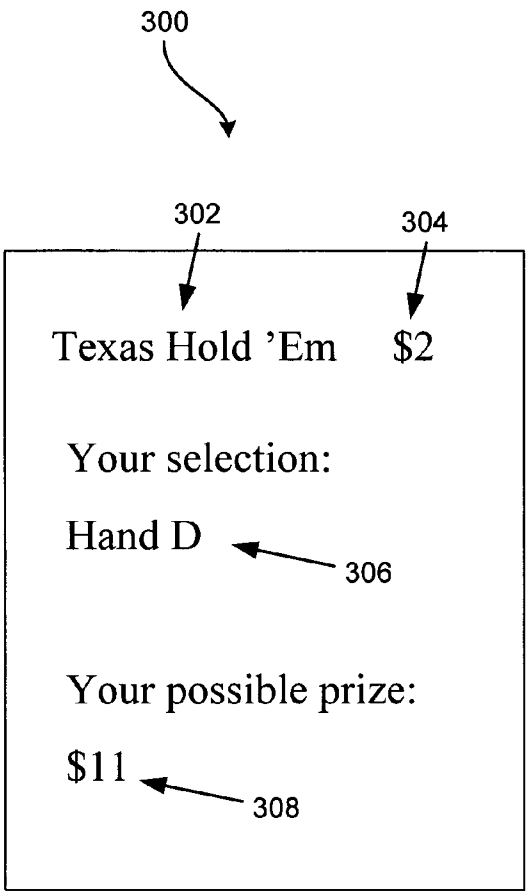
FIG. 3 illustrates a ticket for the Hold'em Poker game.

FIG. 2 shows a play slip 200 that may be used to make wagers in a Texas Hold'em game. The play slip 200 includes the name of the game 202, the cost of the wager 204, instructions for the player 206, a set of indicia 208 corresponding to the indicia on the video display 100 described above, and areas 210 where the player may indicate his selection. After the player marks his selection, the play slip 200 is given to a lottery retailer, who may scan the ticket on a computer terminal, thereby registering the wager with, for example, a central control system. After the wager has been recorded, the central system will cause the terminal to issue a ticket 300, shown in FIG. 3, to the player, the ticket 300 indicating, for instance, the name of the game 302, the cost of the wager 304, the player's selection 306, and the prize to be awarded 308 if the player's selection is among the winning hands.

Figure 4:
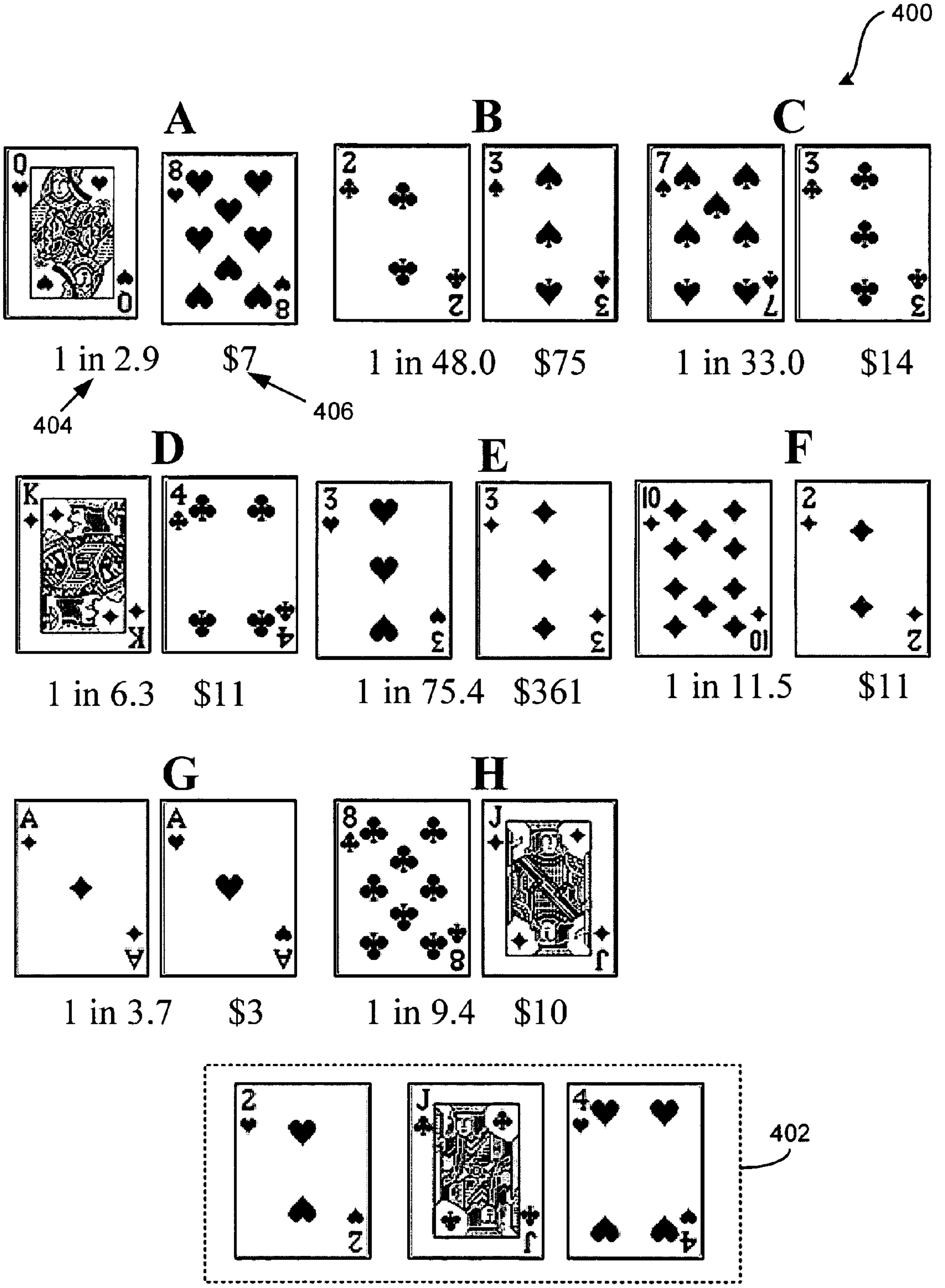
FIG. 4 illustrates the video display after three community cards have been revealed.

FIG. 4 shows a video display 400 after three of five community cards 402 have been revealed. The set of community cards may be determined in various ways. In one embodiment, the community cards may be determined as if dealt from a randomly-ordered deck, as in a real game. After the community cards 402 are displayed, the odds 404 and prizes 406 associated with each hand may be updated to reflect the chances of each hand. In this case, the odds displayed to the player may represent the actual probabilities of the various hands winning, as if the game were being played with a physical deck. In another embodiment, the set of community cards may be determined by a probability distribution, in which case the actual set of cards could be selected by a random number generator. For each initial set of hands there could be a probability distribution on the sets of community cards. In this case, the odds 404 assigned the initial hands may be derived from the probability distribution. For example, the odds assigned to a hand could be the sum of the probabilities for sets of community cards in the distribution that make the hand a winner. It is understood that, in certain embodiments, these methods could be implemented in stages or in combination. For example, it could be such that the first three community cards ("the flop") 402 could be determined by a probability distribution and the remaining two cards ("the turn" and "the river") could be determined as if dealt from a randomly ordered deck.

Figure 5:
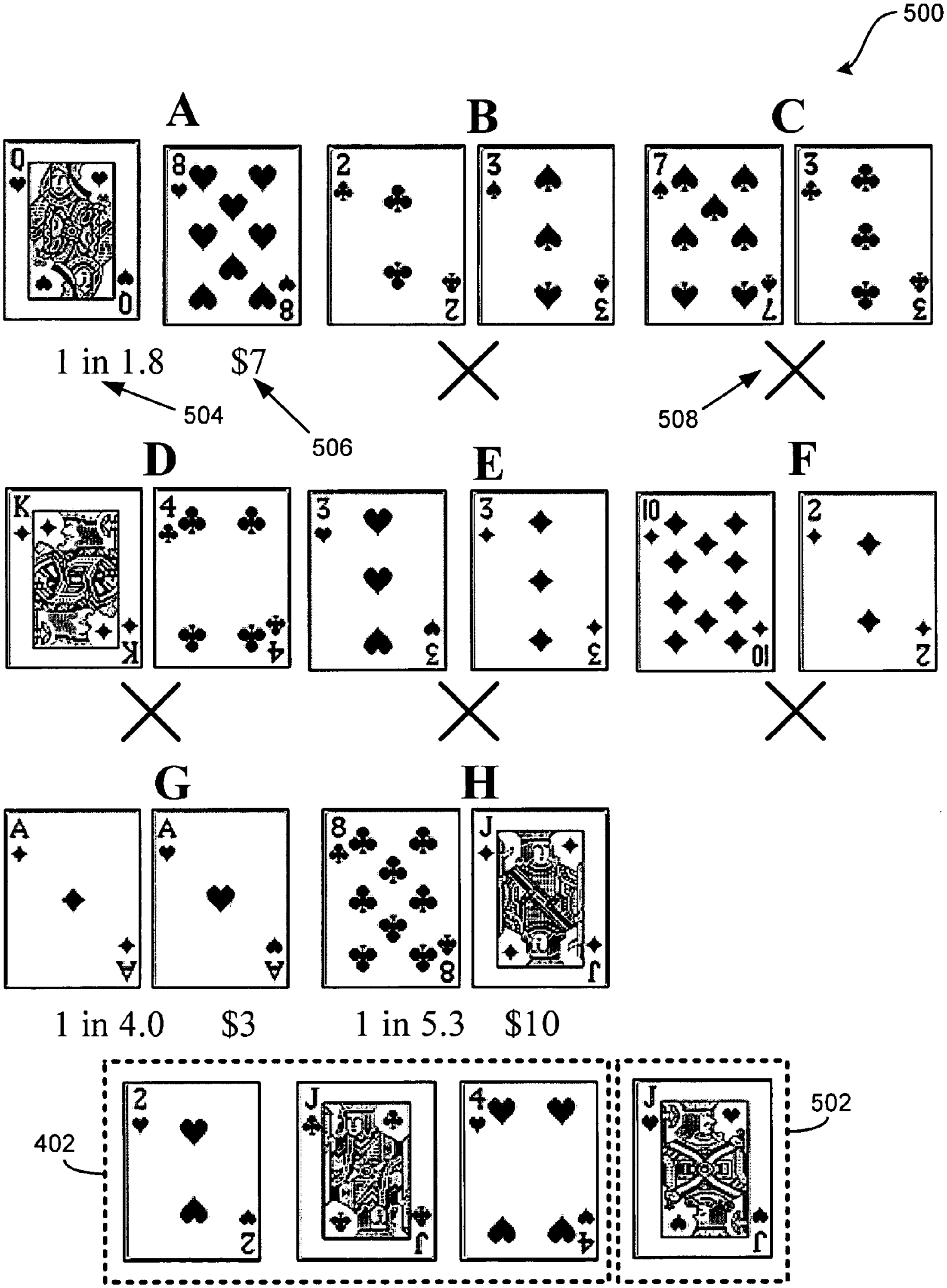
FIG. 5 illustrates the video display after the fourth community card has been revealed.

FIG. 5 shows the video display 500 after the fourth community card 502, also known as "the turn," has been revealed. The odds 504 displayed may be adjusted to reflect the probabilities of the various hands winning, which may have changed due to the values of all four community cards that have been revealed. In this case, the odds 504 might no longer be displayed for any hand, such as hands B-F that cannot possibly win. Alternatively, the original odds may continue to be displayed. In yet another embodiment, a non-winning indication 508 may be associated with each non-winning hand.

Figure 6:
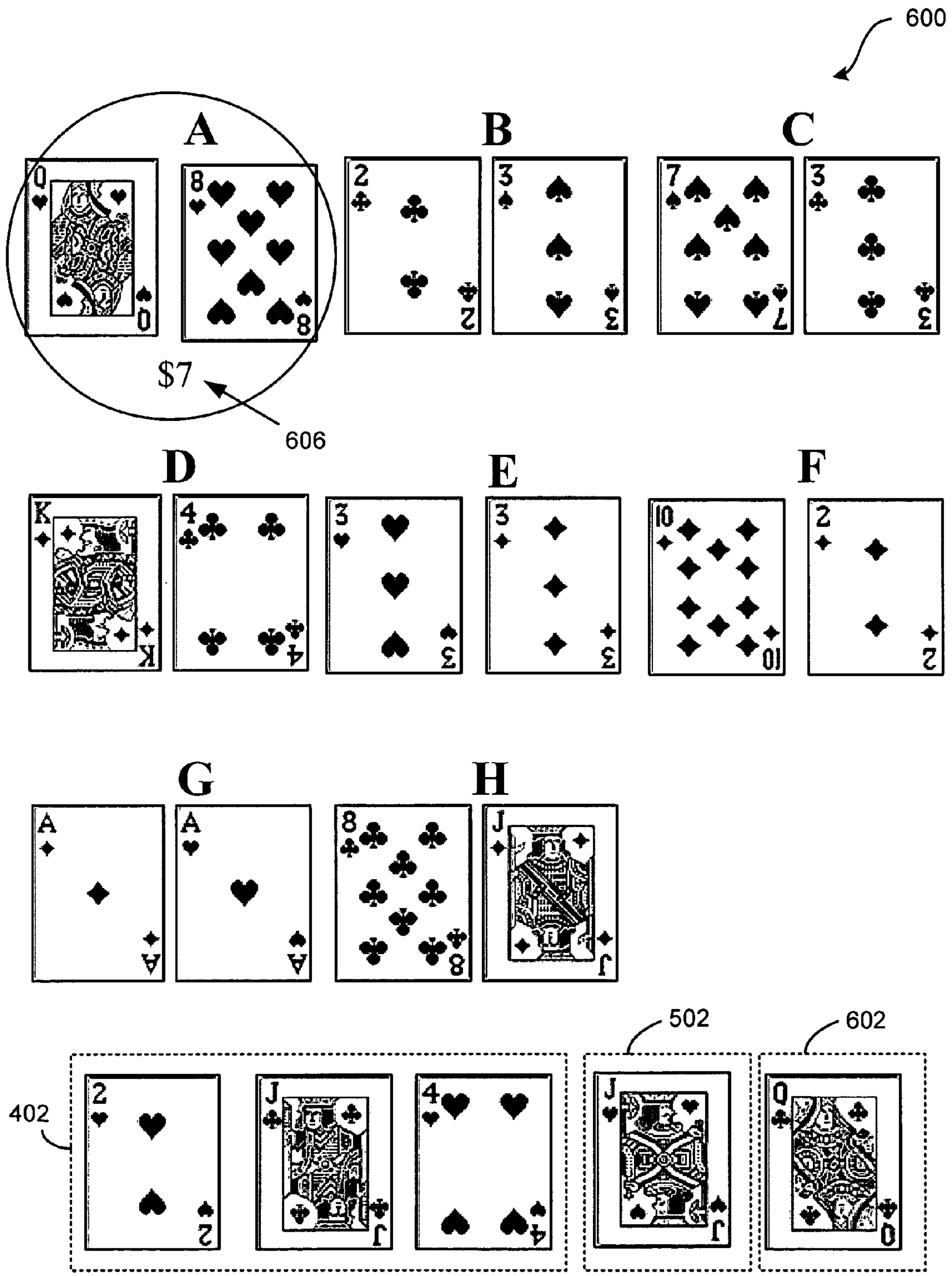
FIG. 6 is an example of the display at the end of the game.

FIG. 6 shows a video display 600 at the end of the game. At this point the last community card, "the river," 602 is revealed. The display or monitor no longer displays any odds, and it displays prize amount 606 for only the winning hand or hands. It may also display an indication of which hands are the winning hands and a verbal description of the outcome.

In various of the embodiments discussed above, the odds of an entry winning may be displayed at three stages of the game: (1) before any community cards have been disclosed, at which point the players make their wagers, (2) after three community cards have been disclosed, and (3) after 4 community cards have been disclosed. It should be appreciated that the odds may be calculated in various ways. For example, consider hand A in FIG. 1 that comprises the queen of hearts and 8 of hearts. There are 376,992 (36 choose 5) equally likely possible combinations for the community cards. Using a computer program, 65,634 of these combinations are identified that result in Hand A being a winner. Thus, the odds that hand A will win is 376,992/65,634=5.7, for which the inverse is 5.7. In FIG. 4, three community cards have been disclosed. There are 528 (33 choose 2) equally likely possible combinations for the remaining 2 community cards. Using a computer program, 182 combinations can be identified that result in hand A being a winner. Thus, at this stage of the game the odds that hand A will win are 528/182=2.9. In FIG. 5, four community cards have been displayed. There are 32 remaining cards. Using a computer program, 18 combinations are identified that result in hand A being a winner. Thus, at this stage of the game the odds that hand A will result in a winner are 32/18=1.8.

It should be appreciated that the discussed embodiments may not preclude the occurrence of multiple winners. The issue of "ties" can be handled in various ways. In one embodiment, the odds and prize values are based under the assumption that players who wager on a given hand will win that amount if that hand is among the winning hands for that game, whether the hand is the sole winner or a joint winner. That is, a player receives the same prize regardless of how many winners there are. In another embodiment, the prizes are set under the assumption that players who wager on a given hand will win that amount only if that hand is the sole winner and that players who wager on the hand will win a smaller amount if that hand is among the winning hands but is not the sole winning hand. For example, each winner could win some fraction of the prize he would have won had he been the sole winner. It is also possible to prevent ties altogether. For each set of initial hands, a probability distribution of sets of community cards could be contrived so that no ties exist in the universe of possible outcomes.

Those of ordinary skill in the art will appreciate that any number of prize structures for this game can be derived by, for example, varying the number of hands played, the pool of sets of initial hands, the probability distribution on the pool of sets of initial hands, the sets of community cards, the probability distribution on the sets of community cards, and the mathematical expectation of the total prize payout.

Figure 7:
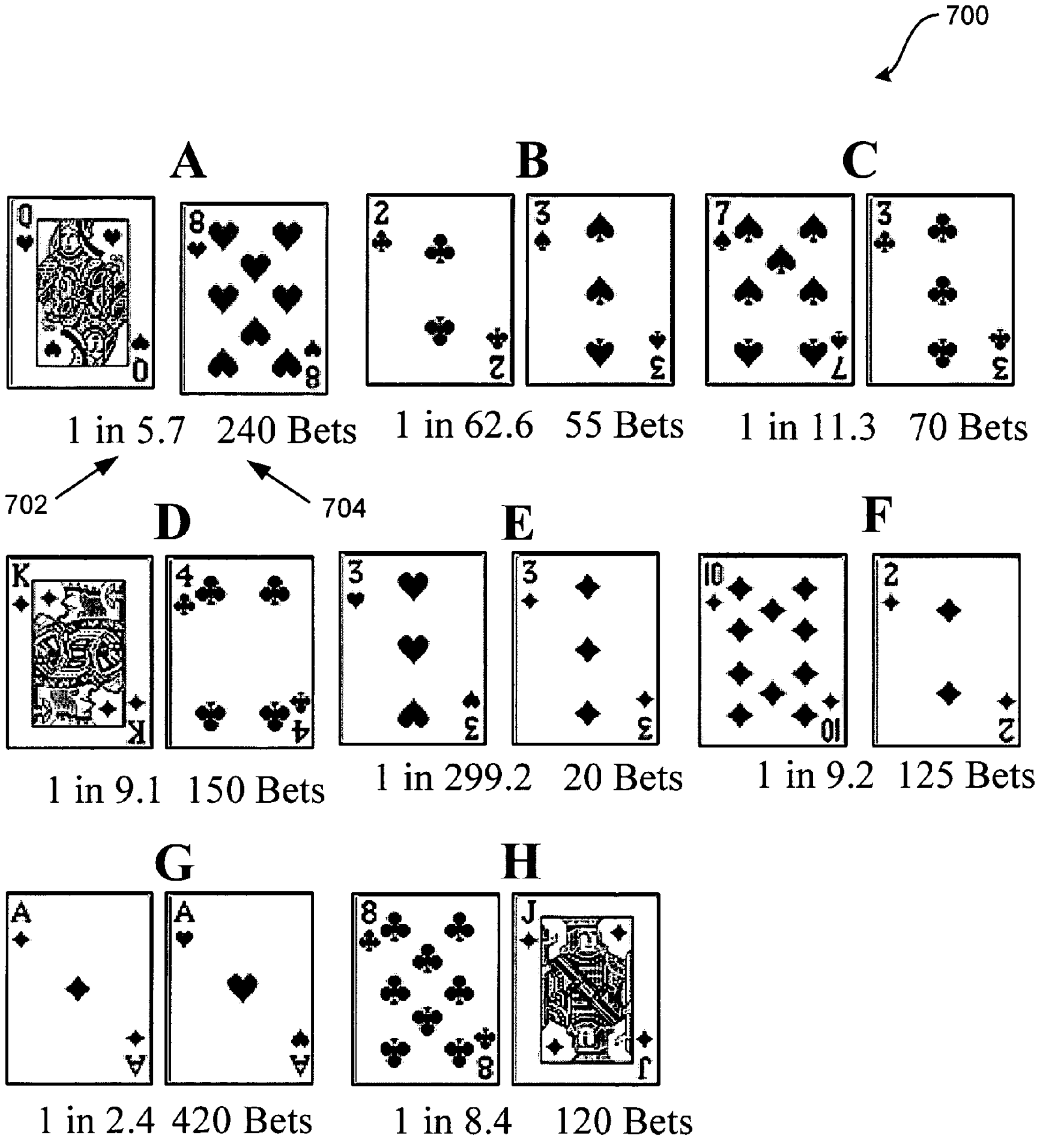
FIG. 7 is an alternative initial display for the invention.
Figure 8:
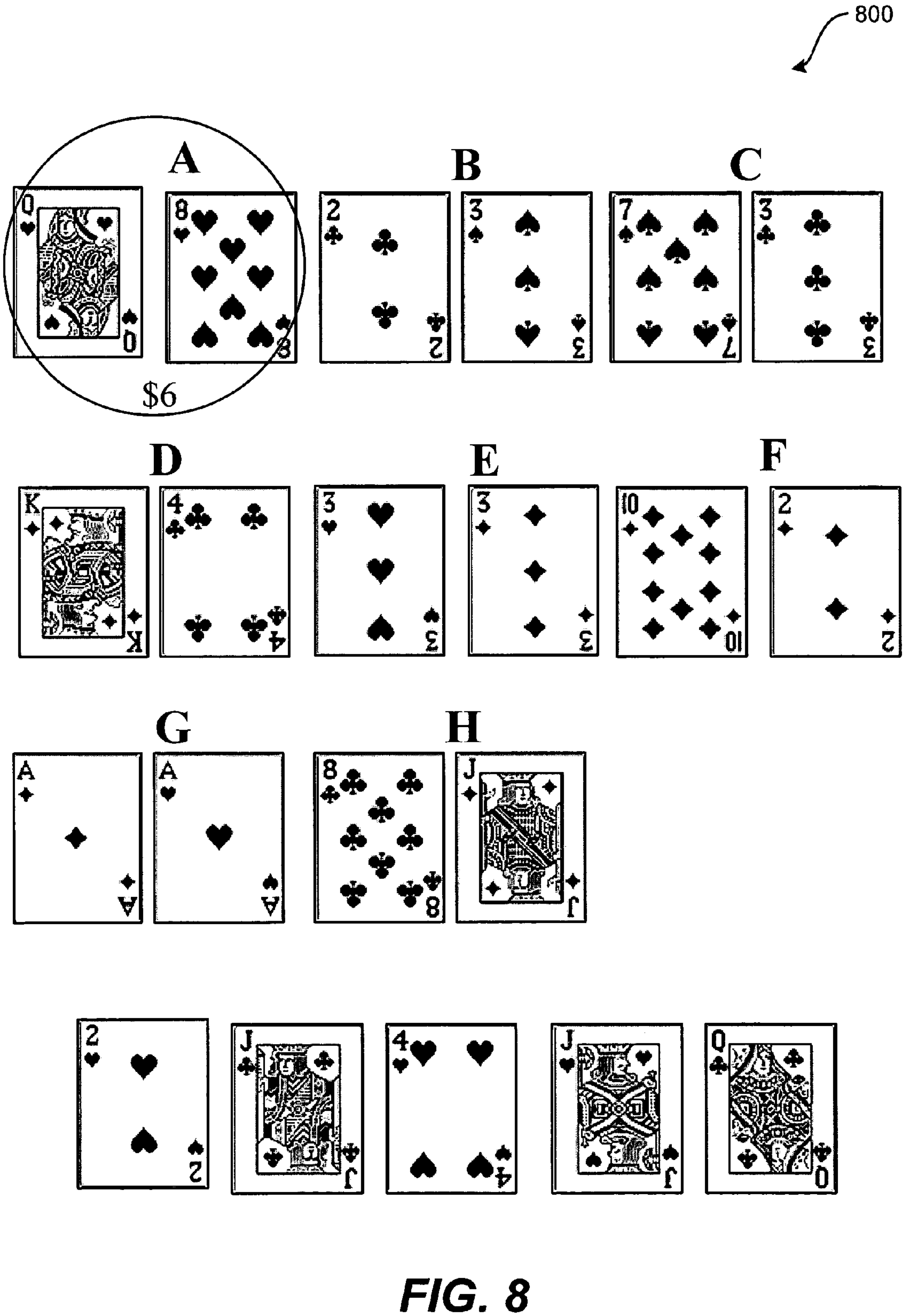
FIG. 8 illustrates the final display with a payout for the winning hand.

In a further embodiment, the prize amounts may be determined not by the probability distribution but rather by the relative amounts wagered in total on each of the hands according to a pari-mutuel scheme as shown in FIG. 7. In this embodiment, the prizes 704 may be displayed dynamically as wagers are made, or they may be displayed only after the window for placing wagers has closed, or they may be displayed only at the end of the game and only for the winning hand or hands. The monitor may display information on the number of bets that have been placed on each opening hand. For example, the odds 702 for the initial hands are displayed along with the number of tickets, or "bets," for each hand. Suppose that a total of 1200 tickets each costing $2 were purchased. As indicated in FIG. 7, suppose that 240 of those tickets selected Hand A as the winner. If A wins, as illustrated in the embodiment of FIG. 8, and the payout is to be 60%, then the pari-mutuel prize payout per winning ticket is (1,200×$2×0.6)/240=$6.

Figure 9:
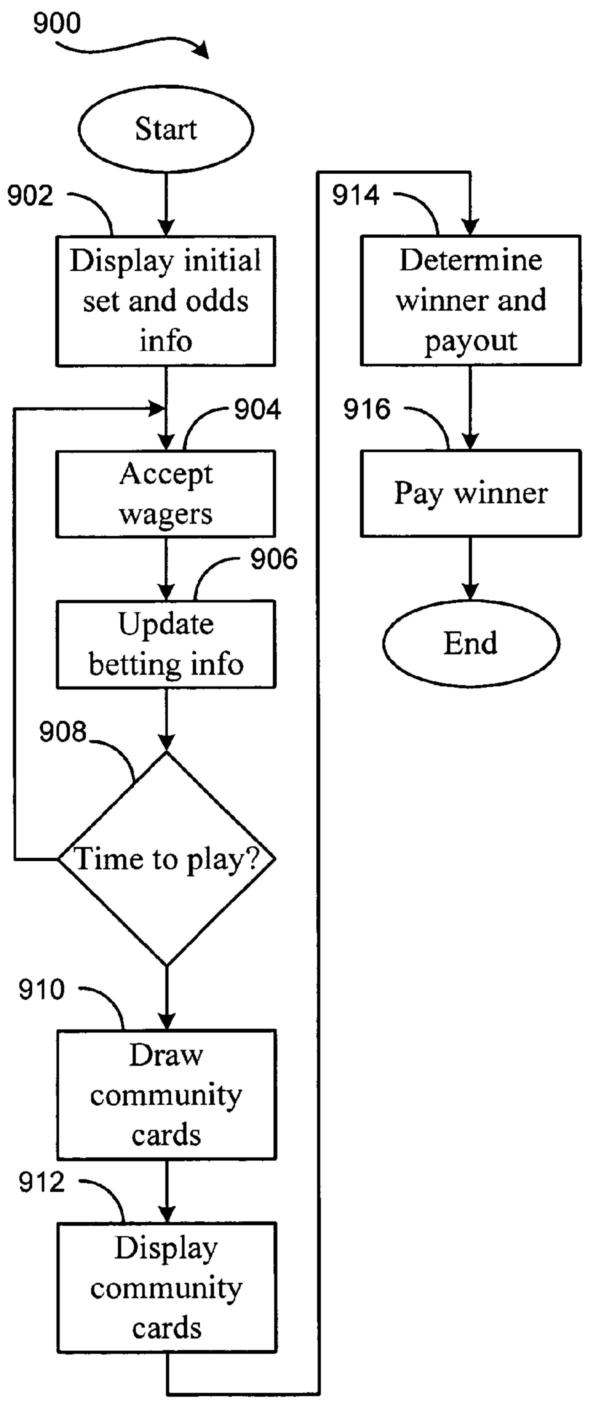
FIG. 9 is a flow chart for a multi-player Texas Hold'em Poker game.

It should be appreciated that the games may be implemented, at least partially, via a computer-implemented system, method, or apparatus. FIG. 9 is a flow chart 900 for a multi-player Texas Hold'em Poker game executed on a server. The server generates an initial set of hands, calculates odds for each hand, and displays the initial set and the corresponding odds information to players, step 902. The display may be on multiple monitors connected directly to the server or connected to a client device that communicates with the server through a network. While the initial set is displayed, the server accepts wagers from the players, step 904. The wagers may be placed at different betting stations that are connected to the server. The wager information is transmitted through a network to the server for processing. The server may compute and update the betting information on the display. For example, the server may update in real time how many bets are placed on each hand as described with respect to FIG. 7. The betting information update may continue as long as the time for placing bets has not expired and the players are still placing bets. After betting is closed, the server generates five community cards, step 910, and display them to the players, step 912. The generation and display of the community cards may be done as described above or via alternative means. After the community cards are drawn and displayed to the players, the server determines a wining hand, or winning hands, and a corresponding payout, step 914. Finally, the winner is paid, step 916.

Figure 10:
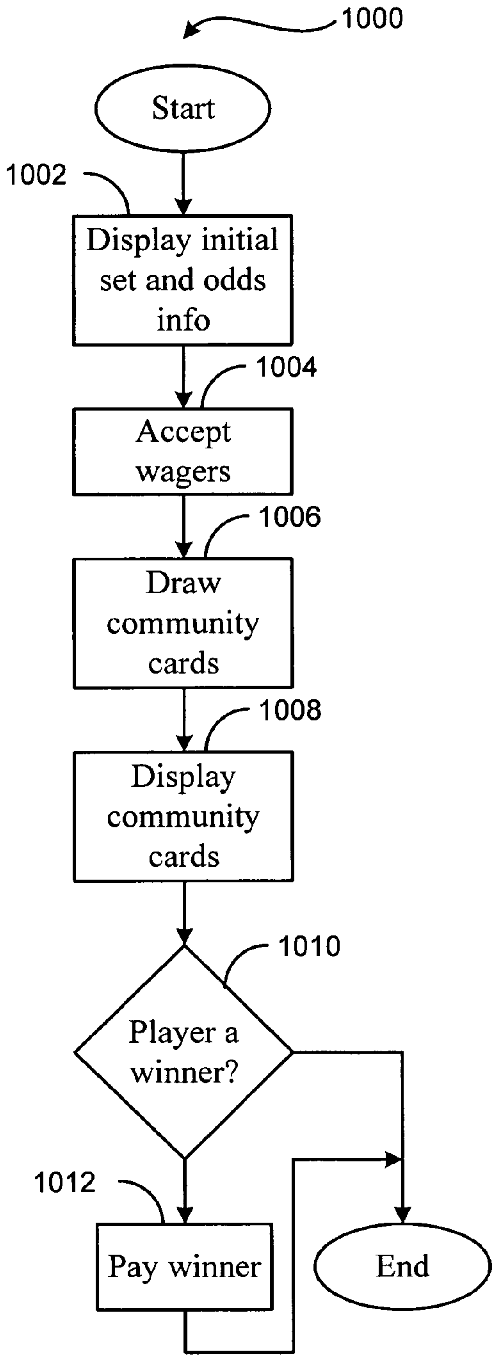
FIG. 10 is a flow chart for a single-player Texas Hold'em Poker game.

FIG. 10 is a flow chart 1000 for a single-player Texas Hold'em Poker game executed on a computing device. The computing device generates an initial set of hands, calculates odds for each hand, and displays the initial set and the corresponding odds information on a monitor to a player, step 1002. While the initial set is displayed, the computing device accepts a wager from the player, step 1004. After the player places a betting, the computing device generates five community cards, step 1006, and displays them to the player, step 1008. The generation and display of the community cards may be done in the manner described above. After the community cards are drawn and displayed to the player, the computing device determines a winning hand, or winning hands, and checks whether the player has the winning hand, step 1010. If the player has a winning hand, the computing device pays the player, step 1012.

Figure 11:
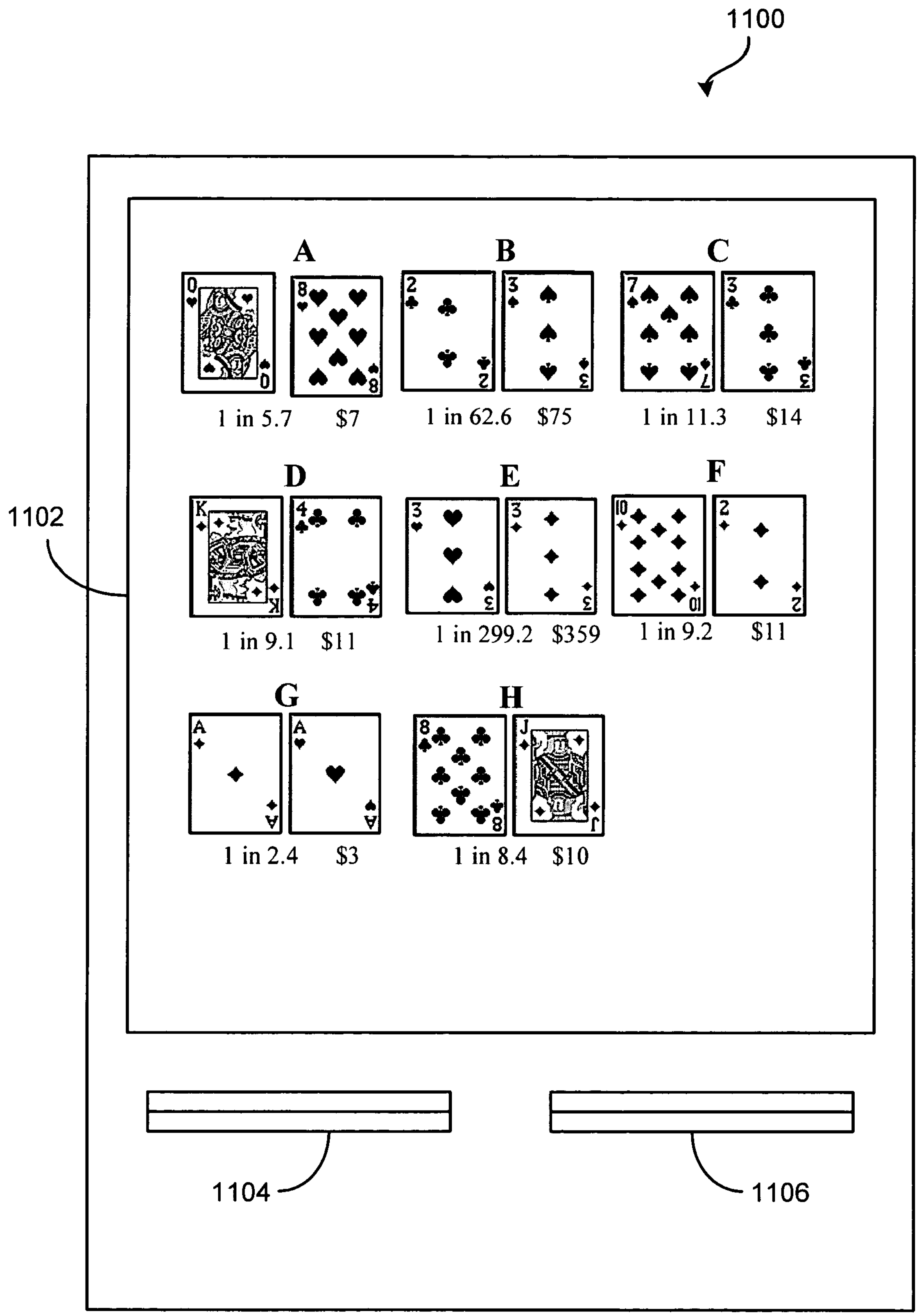
FIG. 11 illustrates a standalone gaming device.
Figure 12:
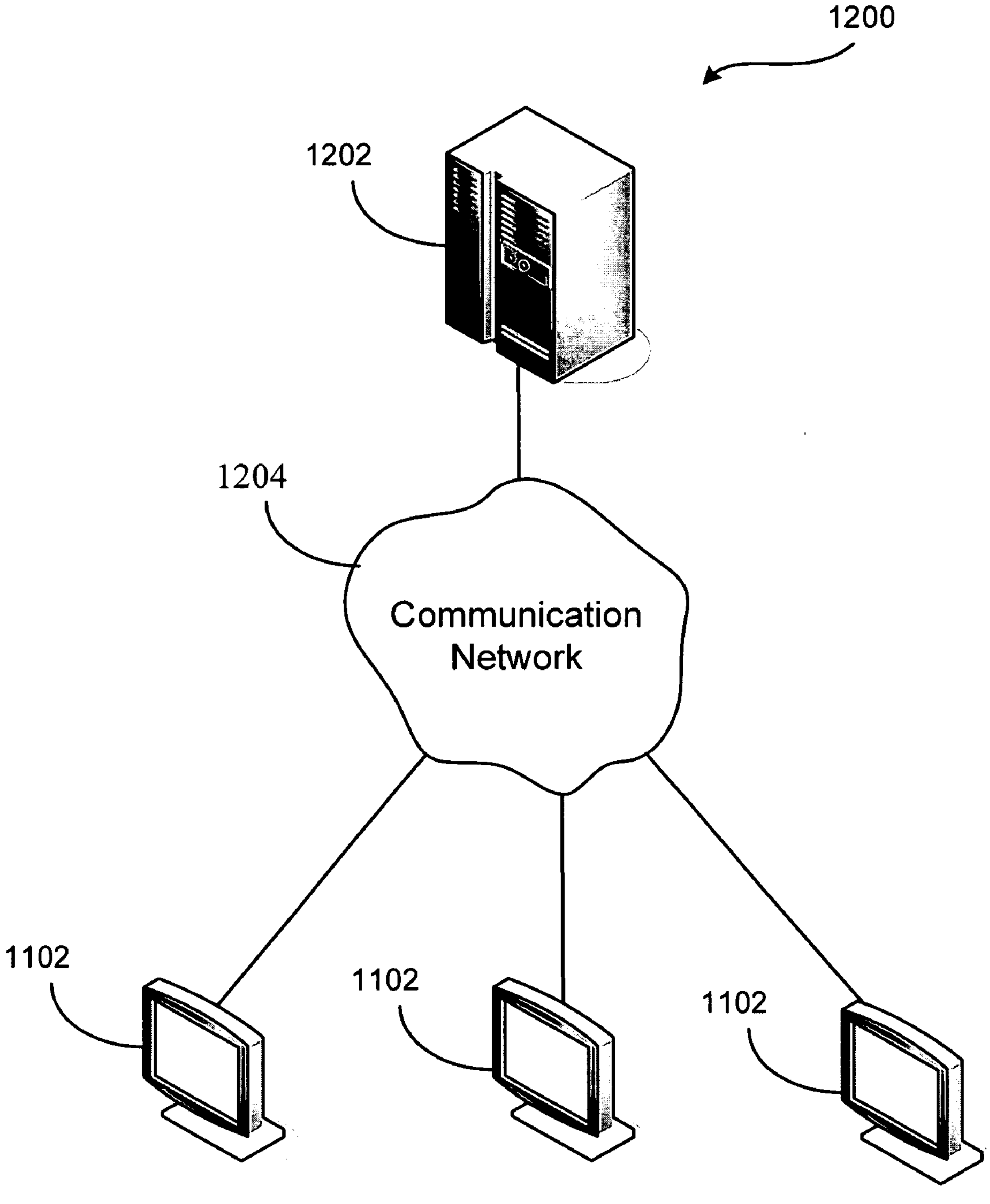
FIG. 12 illustrates a plurality of network-based gaming devices.

In certain embodiments, the game may be implemented via a standalone gaming machine or a server. FIG. 11 illustrates an embodiment of a standalone gaming device 1100 for simulating a card game. The gaming device 1100 includes a display unit 1102, a player input device (e.g., scanning unit 1104) for scanning play slips, and a ticket issuing unit 1106 for issuing tickets to players. The gaming device 1100 has a controller that generates the initial set of entries and displays the initial set on the display unit 1102. The controller also takes player bets from the scanning device and issues a ticket to the player. After issuing the ticket, the controller generates gaming information, which includes a set of community cards, and determines if the player has a winning hand according to the predefined rules of the game. The gaming device 1100 may also be connected to a server 1202 as illustrated in FIG. 12, in which case the gaming device 1100 may further comprise a suitable network interface device (not shown). The gaming device 1102 is connected to the server 1202 through a communication network 1204. In the embodiment illustrated in FIG. 12, each gaming device receives wagers from players, passes betting information to the server 1202, and displays the game information received from the server 1202.

Figure 13:
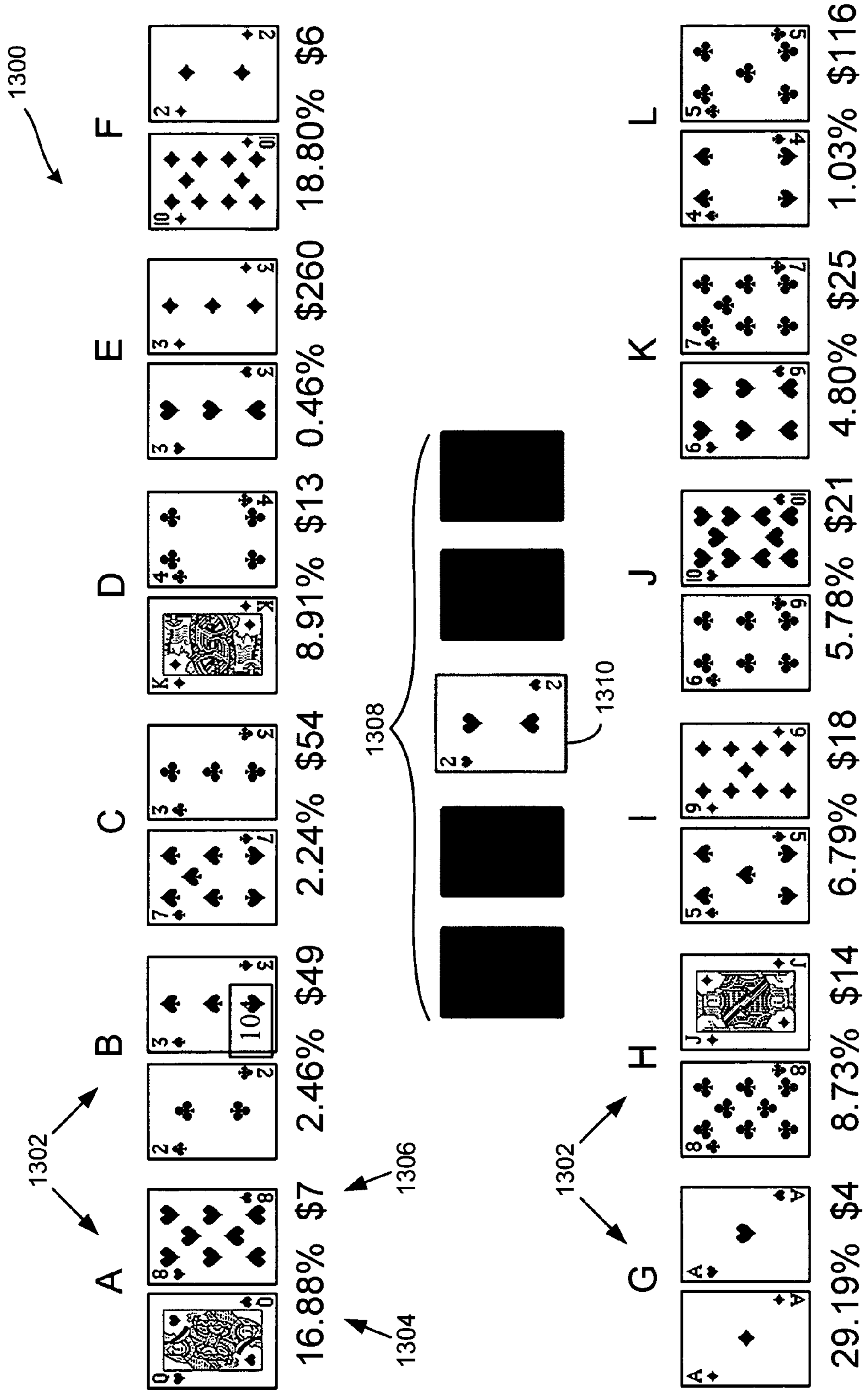
FIG. 13 illustrates an initial display for another embodiment of a Texas Hold'em Poker game.

As mentioned above, the cards may be displayed and revealed to the players in various ways. For example, in certain embodiments, players may place bets with one or more community cards revealed in advance and for which the prizes are fixed amounts. As illustrated in the embodiment of FIG. 13, 12 hands, labeled A-L, may be displayed on which the player places a bet. In this example, the unit bet price is $2 and the payout is between 50% and 70%. Prizes for hands may be first computed to yield a return of 60%. Subsequently prizes may be rounded to the nearest dollar, which may result in the payout for a hand deviating from 60%. As further illustrated in FIG. 13, in this embodiment, one of the 5 community cards, the 2 of hearts, is initially displayed prior to placing a bet. The remaining 4 community cards may be revealed once the players have placed their bets. Probabilities may be assigned to each of the hands, based on the revealed community card and the fact that the remaining 4 community cards are randomly chosen from the remaining 27 cards (i.e., the standard 52 cards minus the 12 hands minus the 2 of hearts). For example, for Hand A, the probability is 16.88% that the hand will win given the other 11 hands and the fact that the first community card is the 2 of hearts. This probability is computed by counting the number of 4-card combinations that confer Hand A a winner out of the remaining 27 cards. For example, a computer program may identify exactly 2,962 such 4-card combinations that confer Hand A a winner. As there are 17,550 combinations of 4 out of 27, the probability is 2,962/17,550=16.88% that the remaining 4 community cards will confer Hand A a winner. Given the price and the probability that a hand will win, it can be assigned a prize. For instance, in the embodiment of FIG. 13, hand A is assigned a prize of $7 per unit bet (yielding a prize payout of 59.1%).

Figure 14:
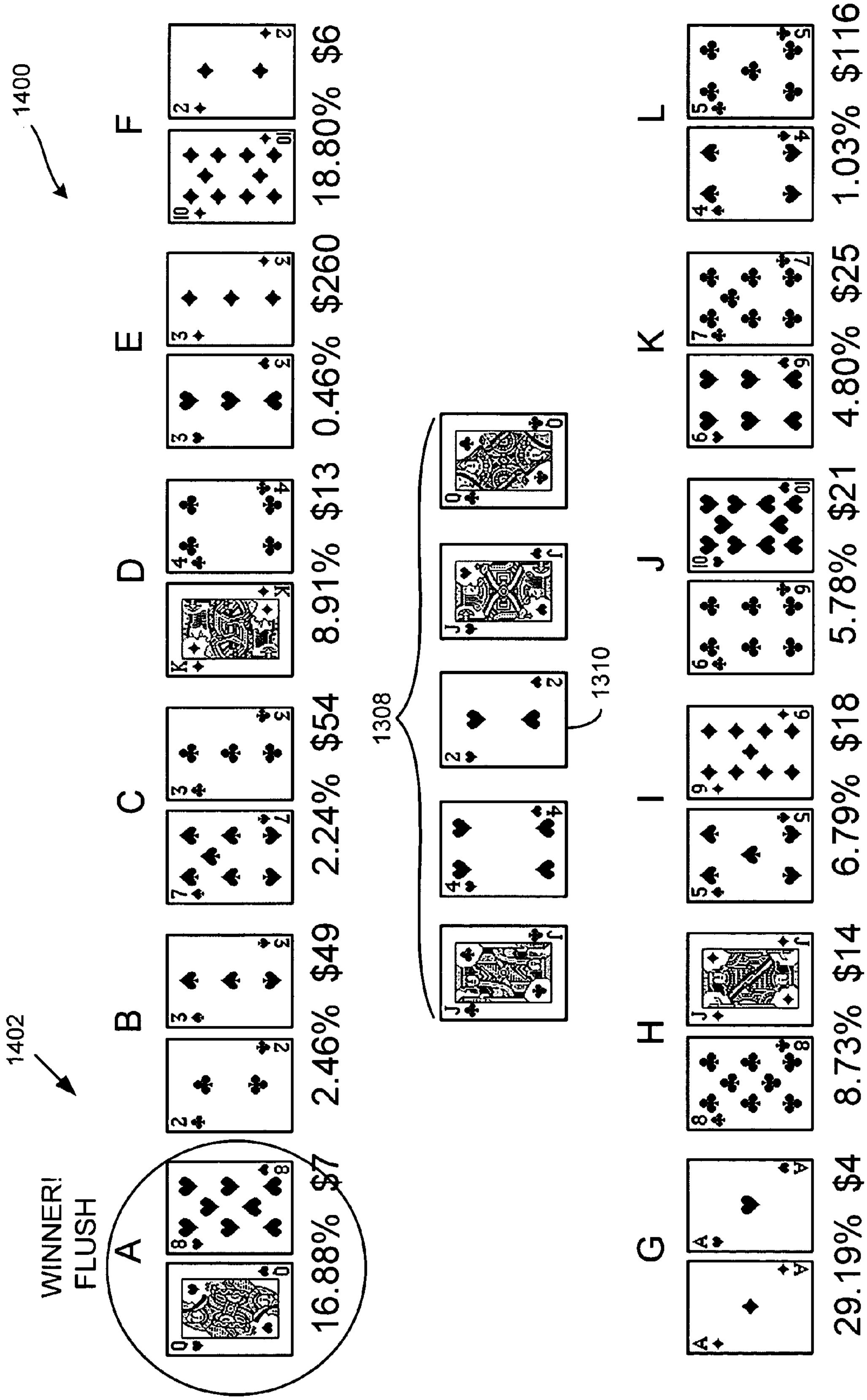
FIG. 14 illustrates the video display of FIG. 13 after the remaining set of community cards are revealed.

As illustrated in FIG. 14, after the players have placed their bets, the remaining 4 community cards may be revealed, thereby conferring the winner(s) (in this example, Hand A wins with a Flush). Players who bet on Hand A receive $7 per $2 wager. The initial set of opening hands and the revealed community card(s) may vary per game. In one embodiment, a database may store sets of opening hands (e.g., each record in a table comprising 12 opening hands and a community card and corresponding probabilities).

Figure 15:
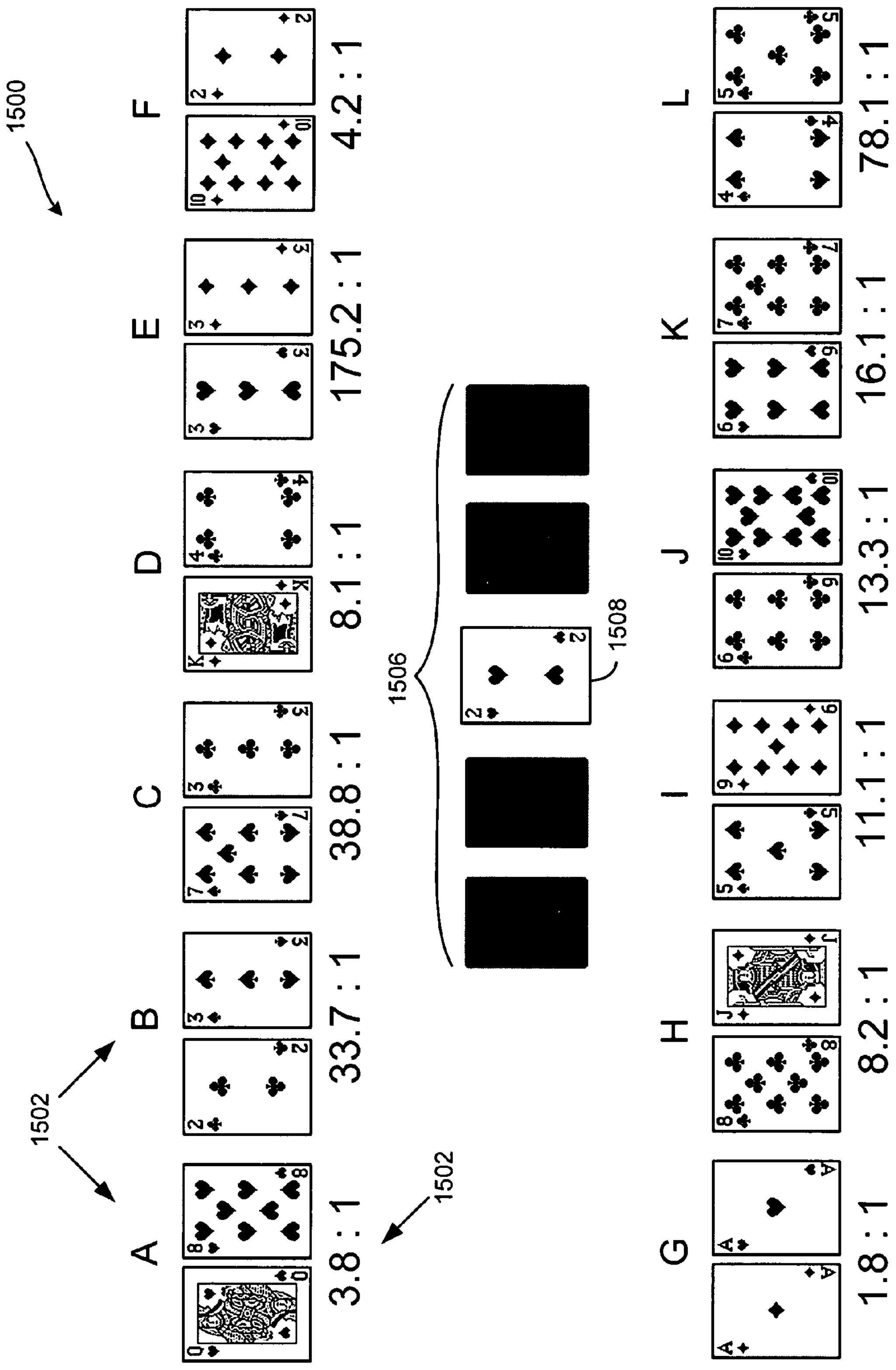
FIG. 15 illustrates the initial display for an embodiment of a Texas Hold'em Poker game which supports pari-mutuel betting.

It should be appreciated that the game may be implemented with various types of permissible bets. In the embodiment illustrated in FIG. 15, a pari-mutuel type of betting scheme is implemented. For instance, display 1500 may display twelve hands 1502, labeled A-L, on which the player places a bet. The unit bet price is $2 and the payout is 80%. Prior to betting, display 1500 may also display one of 5 community cards 1506 (in this case, the pre-betting community card 1508 is the 2 of hearts). The remaining 4 community cards may be revealed once the players have placed their bets. As illustrated in FIG. 15, display 1500 may include odds 1504 for each hand 1502 as defined in, for example, pari-mutuel horse racing. For example, for Hand A, the odds are 3.0:1. It may be determined that the prize for 1 unit bet is 3.8 units more than 1 unit (e.g., 4.8 units). These odds may be based on the bets that have been placed and may be periodically updated as players are making their bets. For example, the odds displayed in FIG. 15 reflect the following betting information: $21,406 on Hand A, $3,014 on Hand B, $2,628 on Hand C, $11,380 on Hand D, $594 on Hand E, $20,100 on Hand F, $37,118 on Hand G, $11,306 on Hand H, $8,594 on Hand I, $7,290 on Hand J, $6,088 on Hand K, and $1,322 on Hand L. In the embodiment illustrated in FIG. 15, the odds for each hand are computed by multiplying the total number of unit bets on all of the hands by the payout percentage (80%), dividing by the number of unit bets on the individual hand, subtracting 1 and rounding down to the nearest 1/10. For example, as there are a total of 65,420 unit bets (the sum of the money on all of the hands divided by the unit price of $2) and there are 10,703 unit bets on Hand A ($21,406/$2), the odds for Hand A are:

$$0.80\times 65{,}420/10{,}703-1=3.89, \text{ which rounded down is } 3.8.$$

After the bets have been placed, the remaining 4 community cards 1506 may be revealed and a winner determined. The winner receives the dividend indicated by the odds for that hand. Ties may be resolved in various ways. For example, the rule could be that the dividend be computed by dividing the "net pool" (e.g., the percentage payout times the total of the bets) by the number of unit bets for the winning hands in the tie combined.

As mentioned above, the players may be permitted to make various types of bets, other than a "win" bet (i.e., the only way to win is for the player's hand to "win"). In other embodiments, the game may be implemented, at least partially, in a live setting with a dealer in a live broadcast. Regarding bet types, the game may incorporate bet types parallel to those of the horse and dog-racing and feature progressive pools. Such a multi-faceted game in a Casino environment may appeal to card players, horse, dog, jai-alai handicappers, pari-mutuel pool numbers players, casino patrons, lottery players, etc. A live embodiment may also improve the players' perceptions of authenticity. Furthermore, the magnitude of the pools may infuse the game with excitement and draw players.

For a live (or partially live) version, a game could be broadcast live from a prominent casino floor in a method similar to the uplinking of a video signal from a track or fronton. A camera may be located above a card table with a live dealer placing the cards on the table with an official "observer" or "judge" in some prominent location to provide heightened credibility. Players may be seated around the table as observers only. Following a complete shuffle, a dealer may place twelve two-card hands face up on the table with an additional four cards face-down in a five-card flop pile with the center card face-up.

Pari-mutuel betting may incorporate a variety of bet types from horse racing (e.g., win, place, show, exacta, quinella, or trifecta bets). In the embodiment illustrated in FIG. 15, a player may wager any of a win, place, show, exacta, quinella, or trifecta bet. A bet slip 1600 such as that illustrated in FIG. 16 may be used. The player selects the bet type 1602 by selecting the corresponding oval 1604, and indicates hands 1606 from columns 1, 2, and/or 3 depending on the bet type. For example, an exacta bet means that the player wins if he correctly guesses the $1^{st}$ and $2^{nd}$ hands in that order. Therefore, for an exacta bet, the player would select a hand from column 1 and a hand from column 2.

Figures 16, 17:
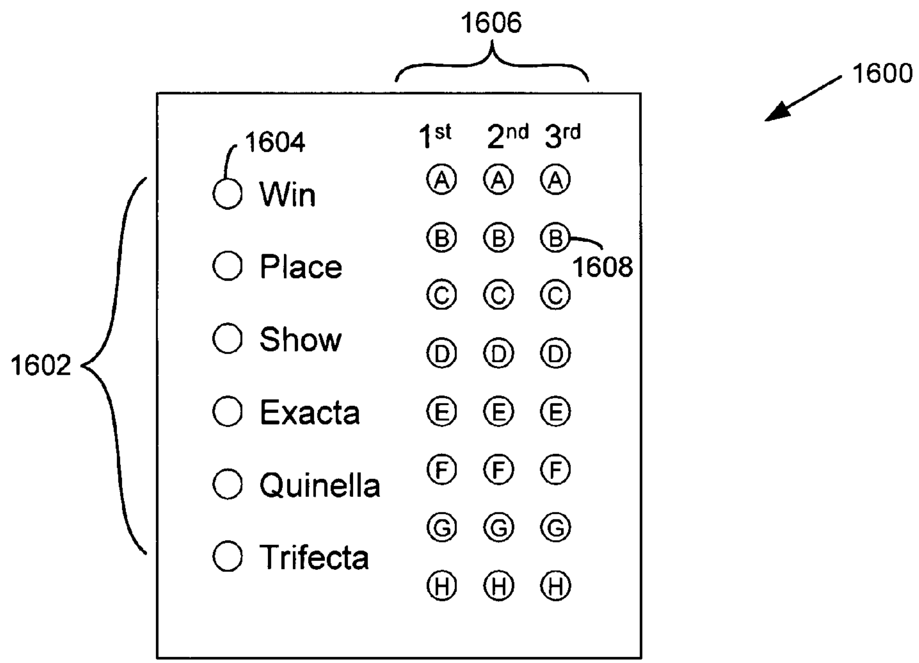
FIG. 16 illustrates an embodiment of a bet slip for making a pari-mutuel bet in the game of FIG. 15.
FIG. 17 illustrates a "bets" display for supporting pari-mutuel betting.

The odds for the win bet type may still be displayed on a primary display. Betting information for the other bet types may be provided to the players on separate display(s) (or on the primary display). For example, there could be a display 1700 of the number of unit bets for the Win, Place, or Show bet types, as illustrated in FIG. 17. As another example, there could be a display 1800 for the number of unit bets for an exacta bet type as illustrated in FIG. 18. Alternatively, or in addition to, the odds derived from the betting information for exacta bets may be displayed on a display 1900 as illustrated in FIG. 19. The displays of this information could be periodically updated.

Figure 20:
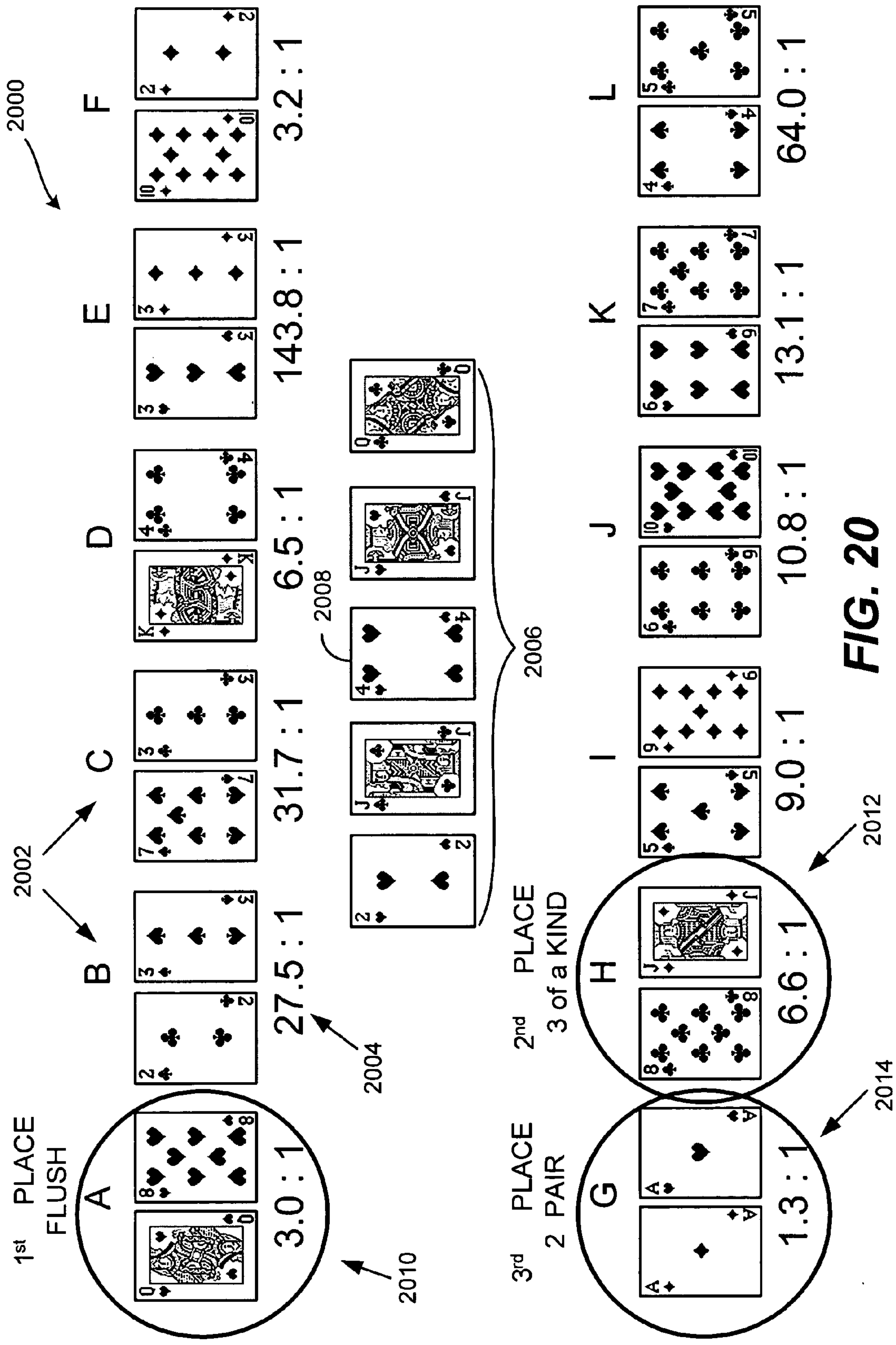
FIG. 20 illustrates a video display of the results of another embodiment of a Texas Hold'em game which supports pari-mutuel betting.

As an example of how the prizes are determined for these "horse-racing"-style bet types, consider the betting information for Win, Place, or Show in FIG. 17. For a $2 per wager, display 1700 displays the individual pools for Win, Place, or Show. Suppose the outcome for the game is as illustrated in FIG. 20 (the $1^{st}$ place winner is Hand A with a Flush, the $2^{nd}$ place winner is Hand H with 3 of a kind, and the $3^{rd}$ place winner is Hand G with 2 pair, Aces High). As Hand A and Hand H place at a 80% payout, the dividend for a Place bet is 80%×the total number of Place bets divided by the number of place bets on Hand A and Hand H (according to the following equation):

80%×(9,295+5,414+17,944+7,972+17,194+10,863+11,386+7,322+7,799+7,476+2,644+574)/(9,295+7,322)=5.0976 units=$10.10 (rounded down to the nearest dime)

Exacta bets are illustrated in FIG. 18. Display 1800 displays the unit bets for each possible selection (e.g., AB means Hand A wins $1^{st}$ place and Hand B wins $2^{nd}$). Based on the bets in FIG. 18, the odds may be displayed as in display 1900 (FIG. 19).

Figure 22:
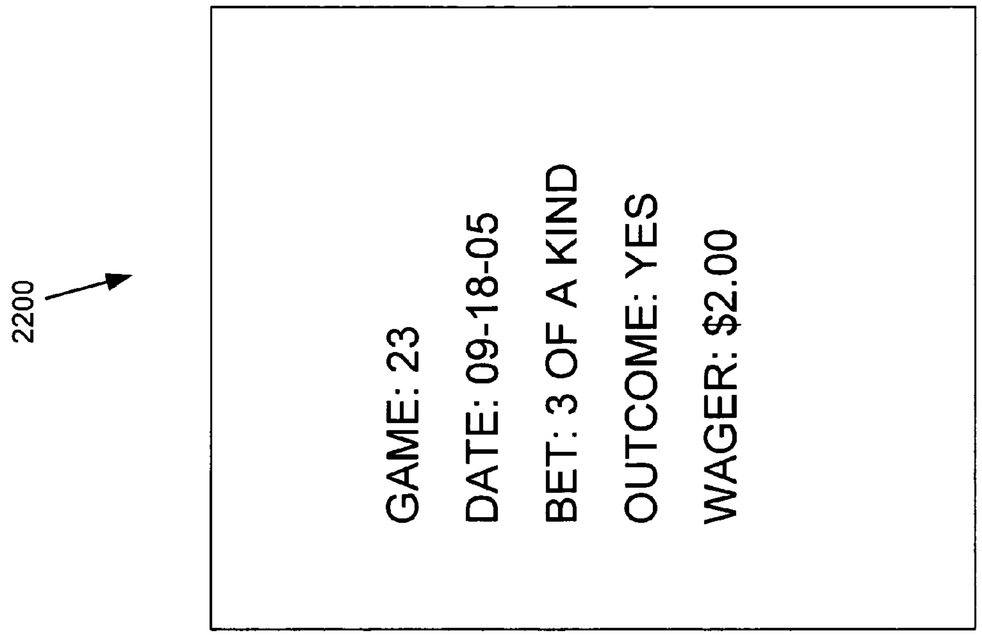
FIG. 22 illustrates an issued ticket from the bet slip of FIG. 21.
Figure 21:
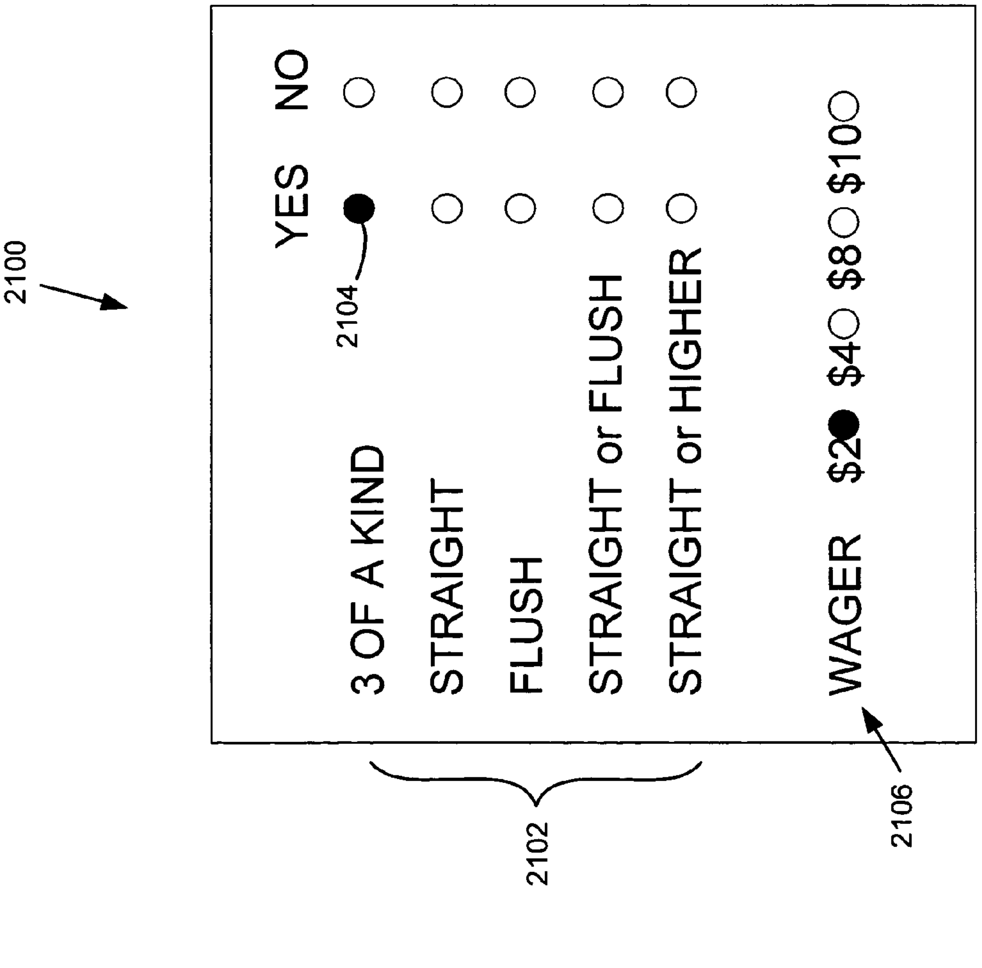
FIG. 21 illustrates a bet slip for making another type of bet.

The game may also support event-based bet types (e.g., a bet that a particular event will or will not occur). A player could bet that a "3 of a kind", "4 of a kind", "Straight," or "Flush," would or would not be the legend assigned to at least one of the hands, once the community cards have been dealt. For example, once the community cards have been dealt, each hand may be assigned exactly one legend for which the hand qualifies (e.g., a pair, three of a kind, two pair, full house, four of a kind, straight flush, royal flush). FIG. 21 illustrates a bet slip 2100 for such a game, in which the player selects a "3 of a kind" bet type. FIG. 22 illustrates a corresponding issued ticket 2200 for this bet, which identifies the game number, date, bet type, outcome, and wager. If the outcome of the game is as in FIG. 20, the legend assigned to hand H is "3 of a kind," because that is the highest hand possible by combining the two cards with the community cards. Suppose the amount bet on the event of "3 of a kind" is $5,746 and the amount bet on the event of a 3 of a kind not occurring is $3,589. Then the dividend for a $2 wager would be $2×(0.80)×($5,746+$3,589)/$5,749=$2.60, i.e., a $0.60 profit.

Also, there could be progressive bet types wherein pools are increased over time. For example, for a 12-hand game, the probability of a Royal Flush occurring is 1 in 2,696.0. These odds may be long enough to support a progressive pari-mutuel pool. To encourage participation at the beginning of the game, the gaming organization (or other hosting entity) could consider seeding the initial pool with an attractive amount of money without incurring significant long term loss. A player who bets on the "Royal Flush," 80% of his wager goes into the pool. If a royal flush is a legend for one of the hands, the pool is divided among the players who placed a Royal Flush bet for that game, otherwise the pool is rolled to the next game.

Other bet types could span multiple games, similar to multi-race bet types in horse racing. In horse-racing, there are bets that apply to multiple races. For instance, a "Pick 6" bet requires the player to select the winner of six consecutive races prior to the first race of the pick six (e.g., the $1^{st}$ 6 races of the day). This type of "multi-event" bet could be adapted to pari-mutuel Poker in various ways.

In an embodiment of a computer-based implementation, sets of opening hands could be determined in advance and made available to the player (e.g., displayed on separate monitors, or rotated on the same monitor). The player may choose a permutation of 6 hands. The player may have the opportunity to select a 6-permutation of the letters A through L indicating his selections for the winners of the $1^{st}$ through $6^{th}$ games.

It should be appreciated that a multi-event bet type may be implemented in various ways. In one embodiment, the multi-event bet type may be conducted to mirror or track a live version of the game. For example, the players could place their "Pick 6" bet once the $1^{st}$ set of opening hands are dealt. A player may place a 6-permutation bet only knowing the opening hands for the $1^{st}$ game. The other selections may be blind.

In another implementation, the "Pick 6" series of games may comprise the same set of opening hands and community cards. That is, the opening hands and community cards may be dealt for the first game. For subsequent games in the series, these opening hands (and possibly a community card) stay the same. The remaining cards are recovered and reshuffled for each game in the series. Yet another way to conduct a multi-event bet is to have simultaneous games conducted.

Any of the bet types described above (or other desirable bet types) may employ a minimum guaranteed payout more than the price point, as in horse racing. This may depend on players betting patterns and the discretion of the operator. Alternately, the house could guarantee that a winning bet would at least receive the initial wager. This would guarantee that the operator would not payout more than the total of the wagers.

It should be appreciated that various aspects of the systems, apparatus, devices, etc. described above may embody functions, features, logic, processes, methods, and/or steps which may be implemented in hardware, software, or any combination thereof by operating a computer or other processing device to execute a sequence of machine-readable instructions. The instructions can reside in various types of signal-bearing or data storage primary, secondary, or tertiary media. The media may comprise, for example, RAM (not shown) accessible by, or residing within, the components of the system. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media.

While the invention has been particularly shown and described with reference to various described embodiments, it will be understood by those skilled in the art that various changes in form and detail may be made without departing from the spirit and scope of the present invention as set forth in the following claims. Furthermore, although various logical functions described above may be illustrated or described in sequential steps, it should be appreciated that different sequences may also be used to implement the invention and one or more of the steps may be performed concurrently. Furthermore, although elements of the invention may be described or claimed in the singular, the plural is contemplated unless limitation to the singular is explicitly stated.

What is claimed is:

1. A controller-implemented method for playing a simulated card game, the method comprising the steps of:

displaying on a display device in communication with a controller a plurality of entries of at least two game elements per entry and displaying at least one of a set of community game elements to a virtual game to a player, each game element of the entries and community game elements associated with a game value according to a game rule for the virtual game;

subsequent to displaying the plurality of entries, revealing at least one of the community game elements to the player prior to receiving an initial wager from the player associated with at least one of the plurality of entries such that the player has knowledge of at least one of the community game elements prior to selecting their initial hand and placing their initial wager, the wager associated with at least one bet type from a plurality of pari-mutuel bet types available to the player;

displaying winning odds associated with each entry in combination with the at least one community game element displayed to the player prior to receiving the wager from the player and displaying a plurality of prizes to the player, each prize associated with an entry;

at least one of the pari-mutuel bet types being a progressive event-based bet wherein an initial payout pool for the progressive bet is seeded with non-player funds;

displaying to the player odds of winning in each of the different available types of pari-mutuel bets for each of the entries, and updating the displayed odds of winning as more bets are placed;

displaying the remaining community game elements to the player once betting is closed;

wherein the step of displaying the remaining community game elements comprises:

displaying the remaining community game elements one at a time; and updating the winning odds after each of the remaining community game elements is displayed;

determining whether the wager wins based on the plurality of entries, the at least one bet type, and according to the game rule for the virtual game.

2. The method of claim 1, wherein the at least one bet type comprises at least one of a win bet, place bet, show bet, exacta bet, quinella bet, or trifecta bet.

3. The method of claim 1, wherein the event-based bet comprises a hand-type bet.

4. The method of claim 1, wherein the at least one bet type comprises a multiple game bet.

5. The method of claim 1, further comprising the step of issuing a ticket with an indication of the player's wager.

6. The method of claim 1, wherein the set of community game elements comprises five community game elements and the game rule comprises rules for Texas Hold'em Poker.

7. The method of claim 1, wherein the displaying the plurality of entries and the set of community game elements and the displaying the remaining community game elements to the player are based on a live deal.

8. The method of claim 1, wherein the steps of displaying the plurality of entries and the set of community game elements, displaying the remaining community game elements to the player, and receiving the wager from the player occur via a communications network.

9. An apparatus for playing a simulated card game comprising:

a controller;

a display device in communication with the controller, the display device configured to display a plurality of entries of at least two game elements per entry and to display a set of community game elements to a player, each game element of the entries and community game elements associated with a game value according to a game rule for the virtual game;

said display device further configured to reveal at least one of the community game elements to the player prior to receipt of the player's selection of an entry from the plurality of entries and an initial bet from the player;

a player input device in communication with the controller, the player input device configured to receive the initial player bet associated with at least one of the plurality of entries selected by the player of at least one bet type selected by the player from a plurality of available pari-mutuel bet types and communicate the player bet to the controller subsequent to the display device displaying the plurality of entries and the revealed at least one community game element to the player such that the player may make their selection of entry and initial bet with knowledge of at least one of the community game elements;

said display device further configured to display winning odds associated with each entry in combination with the at least one community game element displayed to the player prior to receiving the bet from the player wherein the display device displays a plurality of prizes to the player, each prize associated with an entry;

said display device further configured to display the remaining community game elements wherein this comprises:

the display device displaying the remaining community game elements one at a time; and the display device updating the winning odds after each of the remaining community game elements is displayed;

at least one of the available pari-mutuel bet types being a progressive event-based bet wherein an initial payout pool for the progressive bet is seeded with non-player funds; and a ticket issuing device in communication with the controller, the ticket issuing device configured to receive ticket information from the controller and issue a ticket to the player, wherein the display device is configured to receive play information from the controller and further configured to display the play information to the player, including odds of winning in each of the different available pari-mutuel bets for each of the entries, and the controller is configured to determine whether the player bet wins based on the plurality of entries and according to the game rule for the virtual game.

10. The apparatus of claim 9, wherein the at least one bet type comprises at least one of a win bet, a hand-type bet, a multiple game bet, a place bet, a show bet, an exacta bet, a quinella bet, or a trifecta bet.

11. The apparatus of claim 9, wherein the set of community game elements comprises five community game elements and the game rule comprises rules for Texas Hold'em Poker.

12. A system for playing a simulated card game, comprising:

a communication network;

at least one gaming machine in communication with the communication network; and a server in communication with the at least one gaming machine through the communication network, the server configured to host a virtual game, wherein the at least one gaming machine is configured to:

receive game information from the server and display a plurality of game entries of at least two game elements per entry and display a set of community game elements to a player, each game element of the entries and the community game elements associated with a game value according to a game rule for the virtual game;

subsequent to displaying the plurality of game entries, revealing at least one of the community game elements to the player prior to receiving an initial player bet from the player associated with at least one of the entries such that the player may make their selection of entry from the plurality of game entries and initial bet with knowledge of at least one of the community game elements and displaying winning odds associated with each entry in combination with the at least one community game element displayed to the player prior to receiving the bet from the player and displaying a plurality of prizes to the player, each prize associated with an entry, and communicating the player bet to the server, the player bet being one of a plurality of pari-mutuel bet types available to the player, with at least one of the pari-mutuel bet types being a progressive event-based bet wherein an initial payout pool for the progressive bet is seeded with non-player funds;

receive ticket information from the server and issue a ticket to the player;

display the remaining community game elements to the player wherein this comprises:

displaying the remaining community game elements one at a time; and updating the winning odds after each of the remaining community game elements is displayed; and receive winning information from the server, the winning information specifying whether the player bet wins based on the plurality of entries and according to the game rule for the virtual game.

13. The system of claim 12, wherein the player bet comprises at least one of a win bet, a hand-type bet, a multiple game bet, a place bet, a show bet, an exacta bet, a quinella bet, or a trifecta bet.

14. The system of claim 12, wherein the set of community game elements comprises five community game elements and the game rule comprises rules for Texas Hold'em Poker.

15. The system of claim 12, wherein the server hosts the virtual game based on a live game.

* * * * *